(12) United States Patent
Ushigusa et al.

(10) Patent No.: US 7,891,256 B2
(45) Date of Patent: Feb. 22, 2011

(54) DIFFERENTIAL-PRESSURE FLOW METER HAVING A MAIN CONTROL BOARD IN A SPACE IN A BASE MEMBER

(75) Inventors: Yoshihiro Ushigusa, Gyoda (JP); Hiroki Igarashi, Gyoda (JP)

(73) Assignee: Surpass Industry Co., Ltd., Saitama (JP)

( * ) Notice: Subject to any disclaimer, the term of this patent is extended or adjusted under 35 U.S.C. 154(b) by 189 days.

(21) Appl. No.: 12/066,138

(22) PCT Filed: Jul. 26, 2006

(86) PCT No.: PCT/JP2006/314722

§ 371 (c)(1),
(2), (4) Date: Mar. 7, 2008

(87) PCT Pub. No.: WO2007/032150

PCT Pub. Date: Mar. 22, 2007

(65) Prior Publication Data

US 2009/0229377 A1   Sep. 17, 2009

(30) Foreign Application Priority Data

Sep. 12, 2005  (JP) .............................. 2005-263338

(51) Int. Cl.
*G01F 1/42* (2006.01)
*G01F 1/37* (2006.01)
(52) U.S. Cl. ................................. 73/861.61; 73/861.52
(58) Field of Classification Search .................... None
See application file for complete search history.

(56) References Cited

U.S. PATENT DOCUMENTS

| 5,174,158 | A | * | 12/1992 | Kremidas ..................... 73/721 |
| 5,596,147 | A | * | 1/1997 | Wilda et al. ................... 73/717 |
| 2003/0010129 | A1 | * | 1/2003 | Gu et al. ....................... 73/716 |

FOREIGN PATENT DOCUMENTS

| JP | H04-053520 U1 | 5/1992 |
| JP | H05-79871 A | 3/1993 |
| JP | H06-213694 | 8/1994 |
| JP | H08-62004 A | 3/1996 |

* cited by examiner

*Primary Examiner*—Harshad Patel
(74) *Attorney, Agent, or Firm*—Thomas & Karceski, P.C.

(57) ABSTRACT

A compact differential-pressure flow meter with reduced wiring is provided. The differential-pressure flow meter has first and second pressure sensors 12A and 12B fixed to a base member 14 on upstream and downstream sides of an orifice member 11 along a flow channel to determine a flow rate based on a pressure difference measured between the two sides of the orifice member 11 by the pressure sensors. The differential-pressure flow meter includes specific control boards disposed near pressure-sensing parts installed in the respective pressure-sensing device and a main control board disposed in a board installation space formed inside the base member. The specific control boards are connected to the main control board with wires passing through a plurality of wiring conduits provided in housings of the pressure-sensing device, and external wiring are connected to one of the specific control boards or to the main control board.

5 Claims, 19 Drawing Sheets

DIFFERENTIAL-PRESSURE FLOW METER HAVING A MAIN CONTROL BOARD IN A SPACE IN A BASE MEMBER

CROSS-REFERENCE TO RELATED APPLICATIONS

This application is a National Phase Application based upon and claims the benefit of priority to PCT/JP2006/314722, filed on Jul. 26, 2006, which is based upon and claims the benefit of priority to Japanese Application, JP 2005-263338, filed on Sep. 12, 2005, the contents of both of which are incorporated herein by reference.

TECHNICAL FIELD

The present invention relates to external orifice members for use in fluid transport channels, for example, fluid transport piping used in various industrial fields, including chemical plants, semiconductor manufacturing, foods, and biotechnology, and also relates to differential-pressure flow meters and flow control devices using such orifice members.

BACKGROUND ART

A differential-pressure flow meter is a device for measuring a flow rate by converting a difference in fluid pressure between the front and rear sides of an orifice member to a flow rate. The differential-pressure flow meter uses, for example, pressure sensors configured to measure variations in the strain of diaphragms with pressure and to feed the resulting electrical signals to an external controller.

Referring to FIG. 20B, for example, a differential-pressure flow meter 1 installed somewhere along a pipe P requires pressure sensors 3A and 3B at two positions upstream and downstream of an orifice member 2. The pair of pressure sensors 3A and 3B each accommodate a control circuit board and must therefore be separately wired and connected to a controller CR. In addition, for operational control of a semiconductor manufacturing apparatus using the flow rate measured with the differential-pressure flow meter 1, for example, wiring for outputting the measured flow rate must be provided between the controller CR, which is required for each differential-pressure flow meter, and an apparatus control sequencer CU for controlling various operations of the semiconductor manufacturing apparatus (for example, see Patent Document 1).

A semiconductor manufacturing apparatus often uses many differential-pressure flow meters 1 arranged in parallel, as shown in, for example, FIG. 20A.

Patent Document 1: Japanese Unexamined Patent Application, Publication No. HEI-6-213694

DISCLOSURE OF INVENTION

The parallel arrangement of many differential-pressure flow meters 1 having the above structure suffers from the problem that installation space must be allocated to both the differential-pressure flow meters 1 themselves and the plurality of controllers CR. In addition, the differential-pressure flow meters 1 and the controllers CR are connected with many wires, namely, two wires for each set, and their connections are complicated because the numerous differential-pressure flow meters 1 are arranged in parallel. Thus, improvements have been demanded in terms of space allocation and wiring operation.

Accordingly, the development of a compact differential-pressure flow meter and its controller with minimum wiring has been desired.

An object of the present invention, which has been made in light of the above circumstances, is to provide a compact differential-pressure flow meter with reduced wiring.

To solve the above problems, the present invention employs the following solutions.

A differential-pressure flow meter of the present invention has a pair of pressure-sensing device fixed to a base member on upstream and downstream sides of an orifice member along a flow channel to determine a flow rate based on a pressure difference measured between the two sides of the orifice member by the pressure-sensing device. The differential-pressure flow meter includes specific control boards disposed near pressure-sensing parts installed in the respective pressure-sensing device and a main control board disposed in a board installation space formed inside the base member. The specific control boards are connected to the main control board with wires passing through a plurality of wiring conduits provided in housings of the pressure-sensing device, and external wiring is connected to one of the specific control boards or to the main control board.

The differential-pressure flow meter of the present invention thus includes the specific control boards disposed near the pressure-sensing parts installed in the respective pressure-sensing device and the main control board disposed in the board installation space formed inside the base member. The specific control boards are connected to the main control board with the wires passing through the plurality of wiring conduits provided in the housings of the pressure-sensing device, and the external wiring is connected to one of the specific control boards or to the main control board. The main control board combines a control function that is conventionally implemented by a controller and a control function common to the pair of pressure-sensing device. This allows the specific control boards to carry only the minimum control function required separately for the pressure-sensing device. The size of the differential-pressure flow meter itself can therefore be reduced because the controller, conventionally a discrete component, is integrated into the main control board and is therefore no longer required, and because the main control board is installed in the board installation space formed inside the base member.

In the above differential-pressure flow meter, preferably, the board installation space is provided under a bottom surface of the base member in a liquid-tight manner, and the pressure-sensing device are joined to a top surface of the base member so that the wiring conduits are sealed from the outside in a liquid-tight manner. In this case, the board installation space in which the main control board is installed has a liquid-tight structure that prevents intrusion of a liquid, such as water.

In the above differential-pressure flow meter, preferably, the wiring conduits are divided into a plurality of conduits to reduce the cross-sectional area of each wiring conduit and increase the number of the wiring conduits, thereby ensuring the necessary cross-sectional area of the wiring conduits. Thus, a plurality of small wiring conduits is provided while effectively utilizing the thickness of members constituting the housings. This contributes to a reduction in the size of the differential-pressure flow meter.

According to the differential-pressure flow meter of the present invention, the specific control boards are disposed near the pressure-sensing parts, and the main control board is disposed in the board installation space. The specific control boards are connected to the main control board with the wires passing through the wiring conduits, and the external wiring is connected to one of the control boards. The main control board combines the control function of a controller that is conventionally required, namely, the control function of a discrete controller, and the control function common to the pair of pressure-sensing device. This allows the specific control boards to carry only the minimum control function required separately for the pressure-sensing device, thus significantly reducing the size of the differential-pressure flow meter to readily ensure sufficient installation space. That is, not only can the size of the differential-pressure flow meter itself be reduced, but also a discrete controller can be integrated into the main control board and is therefore no longer required. If the differential-pressure flow meter is installed in equipment such as a semiconductor manufacturing apparatus, its compact installation space allows the size of the equipment to be reduced. It also significantly reduces the nuirber of steps involved in the installation operation because the number of components and the steps in wiring operation, for example, can be reduced.

BEST MODE FOR CARRYING OUT THE INVENTION

An embodiment of a differential-pressure flow meter according to the present invention will now be described with reference to the drawings.

Figure 6:
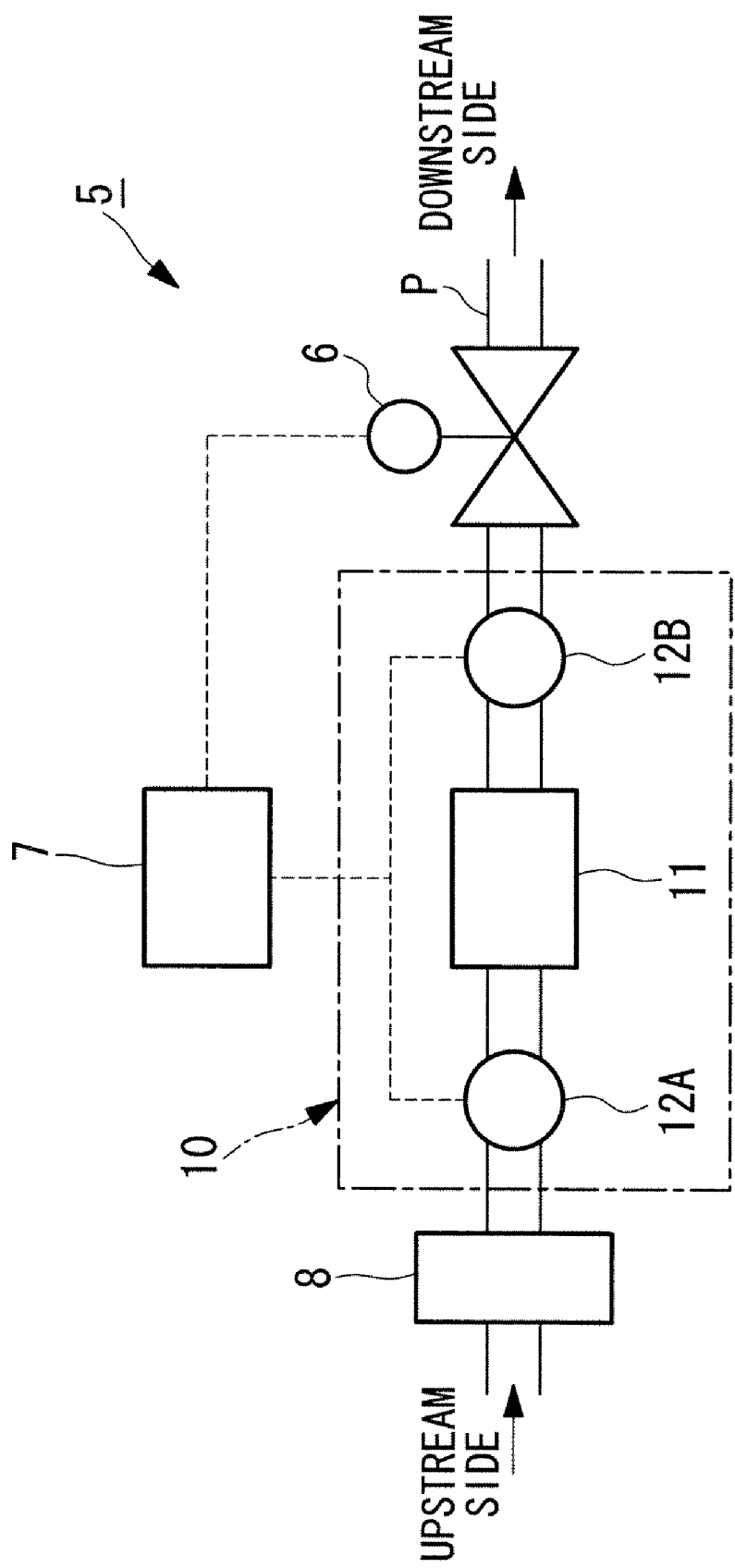
FIG. 6 is a block diagram showing a configuration example of a flow control device including the differential-pressure flow meter according to the present invention.

Referring to FIG. 6, a differential-pressure flow meter 10 according to this embodiment is installed in and constitutes part of, for example, a fluid transport pipe (flow channel) P for use in various industrial fields, including chemical plants, semiconductor manufacturing, foods, and biotechnology. The differential-pressure flow meter 10 is used in a flow control device 5 to control the flow rate of a fluid supplied by back pressure from the upstream side to the downstream side through the fluid transport pipe P.

In this embodiment, the flow control device 5 is assumed to be used in a fluid transport pipe through which a liquid is transported at a back pressure of about 50 to 500 kPa by means of, for example, pumping by pressure application or using a feed pump, or applying potential energy.

The flow control device 5 includes the differential-pressure flow meter 10 and a flow control valve 6 connected upstream or downstream of the differential-pressure flow meter 10 to control the flow rate of a fluid supplied from the upstream side to the downstream side.

The differential-pressure flow meter 10 integrally includes an orifice member 11, a first pressure sensor (pressure-sensing device) 12A connected upstream of the orifice member 11 and used as a pressure-measuring unit to measure the fluid pressure at the connection position, and a second pressure sensor (pressure-sensing device) 12B connected downstream of the orifice member 11 to measure the fluid pressure at the connection position.

The flow control valve 6 of this embodiment is connected downstream of the second pressure sensor 12B. A sufficient back pressure can therefore be applied to the first and second pressure sensors 12A and 12B to stabilize the characteristics of the first and second pressure sensors 12A and 12B. In addition, the accuracy of measurement with the first and the second pressure sensors 12A and 12B becomes less susceptible to variations in the pressure of the fluid supplied to the flow control device 5. The flow control valve 6 and the first and second pressure sensors 12A and 12B are connected to a control unit 7.

In this embodiment, additionally, a pressure control valve 8 is provided upstream of the first pressure sensor 12A to suppress variations in the pressure of the fluid supplied to the first pressure sensor 12A, thereby maintaining a predetermined pressure. This allows the accuracy of measurement with the first and the second pressure sensors 12A and 12B to be less susceptible to variations in the pressure of the fluid supplied to the flow control device 5 which can be caused by, for example, a disturbance from another piping system connected in parallel with the fluid transport pipe P under the flow rate control.

Referring to FIGS. 1 to 4, the differential-pressure flow meter 10 described above is a flow meter having the pair of first and second pressure sensors 12A and 12B fixed to a base member 14 on the upstream and downstream sides of the orifice member 11 along a flow channel 13 to determine a flow rate based on a pressure difference measured between the two sides of the orifice member 11 by the first and second pressure sensors 12A and 12B.

Figure 1:
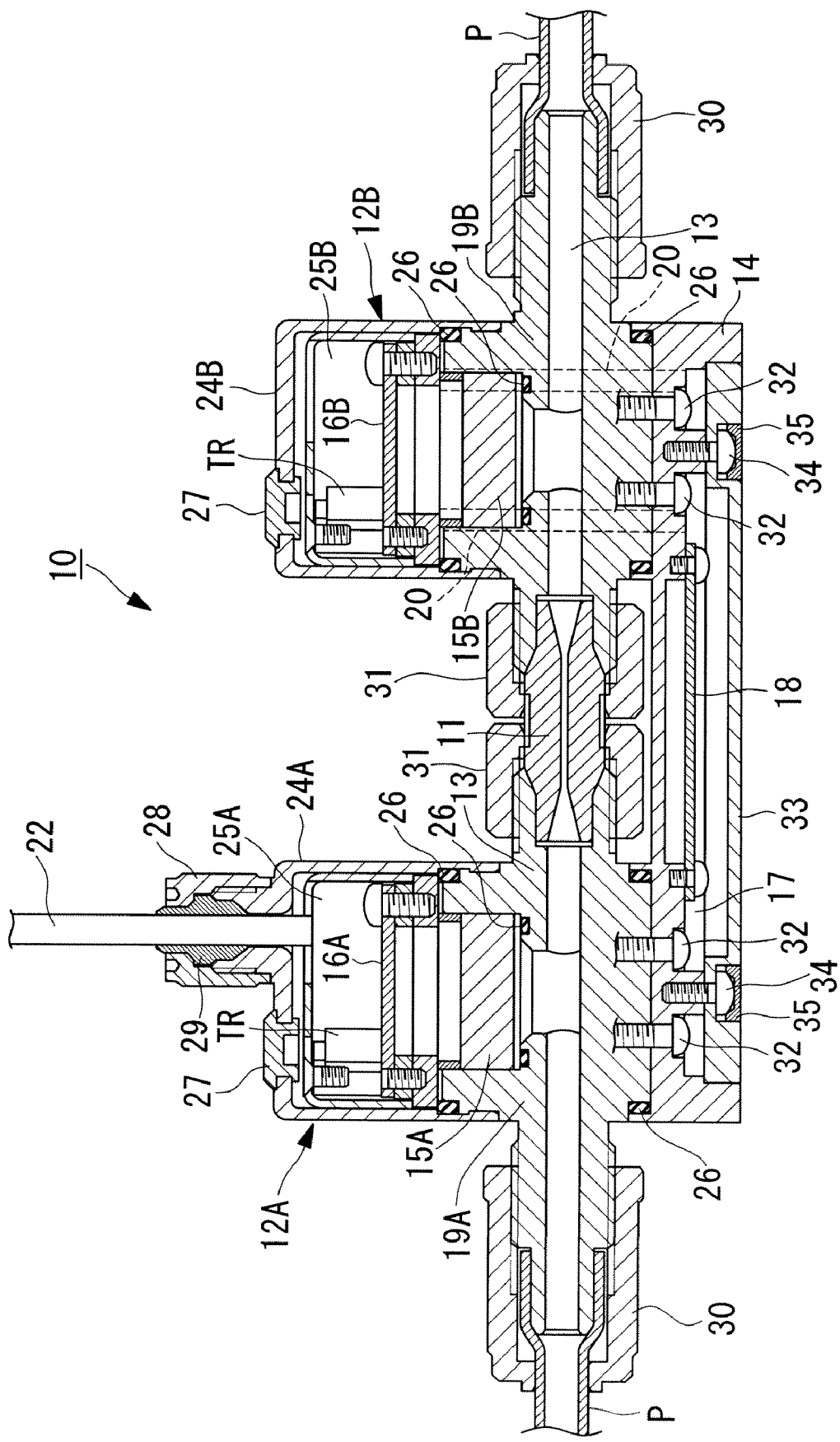
FIG. 1 is a sectional view showing an embodiment of a differential-pressure flow meter according to the present invention.
Figure 2:
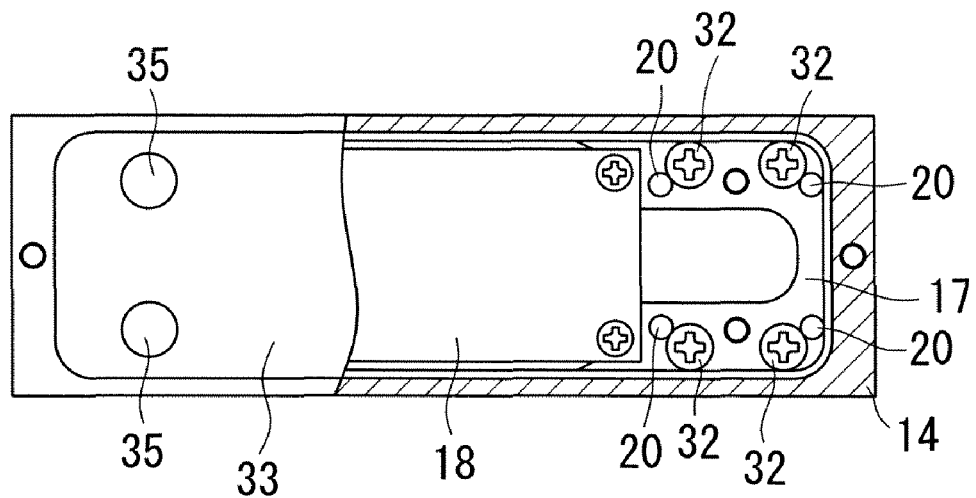
FIG. 2 is a partial sectional view showing a bottom surface of the differential-pressure flow meter shown in FIG. 1.
Figure 3:
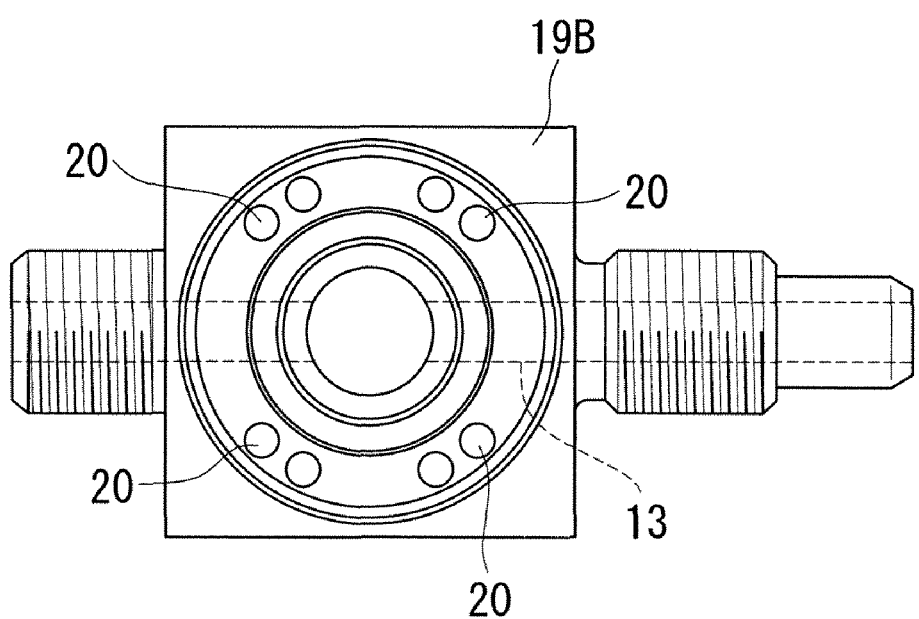
FIG. 3 is a plan view of a housing shown in FIG. 1.
Figure 4:
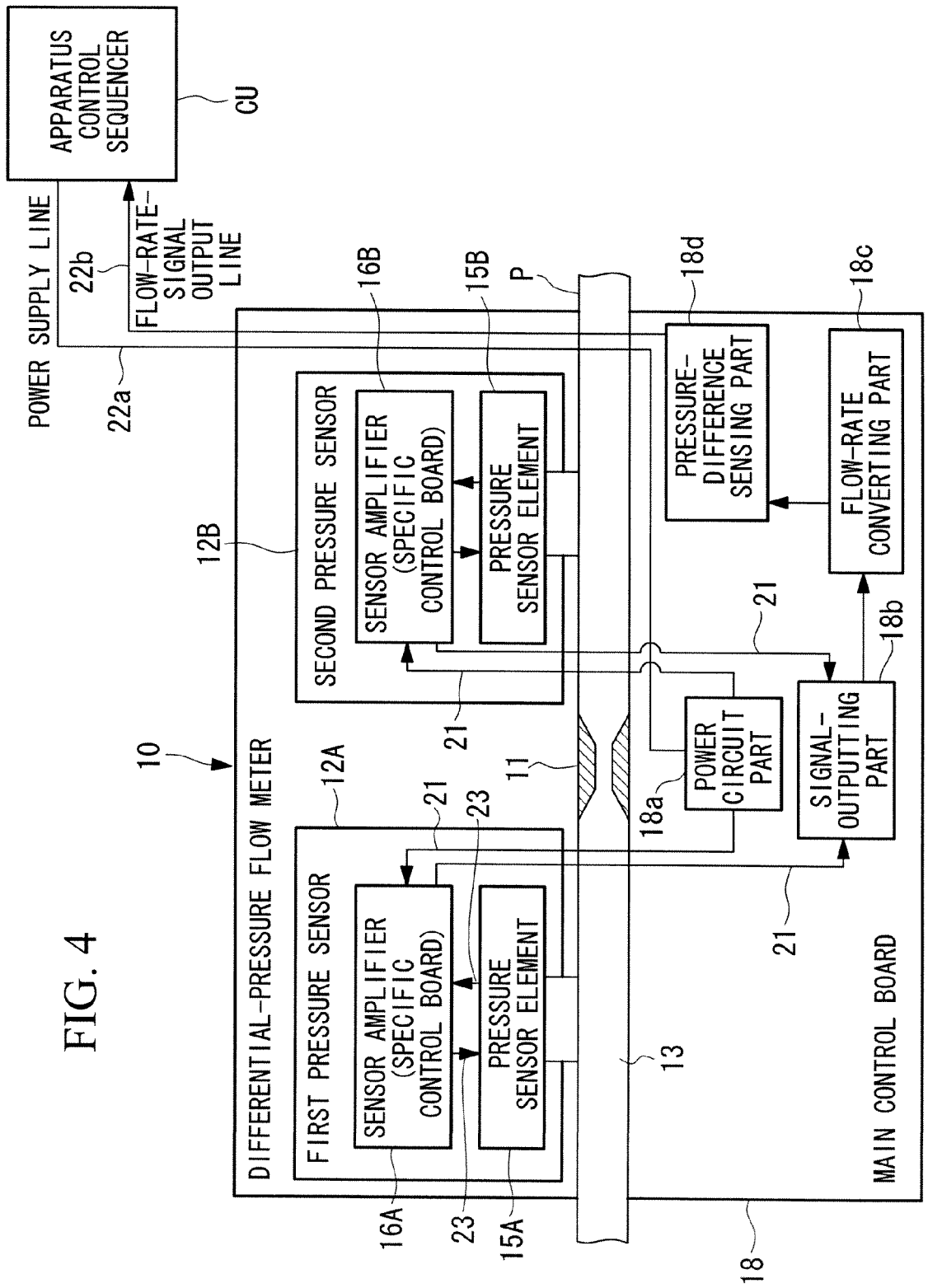
FIG. 4 is a block diagram showing a configuration example of the differential-pressure flow meter shown in FIG. 1.

The differential-pressure flow meter 10 includes specific control boards 16A and 16B, constituting sensor amplifiers, disposed near pressure sensor elements (pressure-sensing parts) 15A and 15B installed in the first and second pressure sensors 12A and 12B, and a main control board 18 disposed in a board installation space 17 formed inside the base member 14. The specific control boards 16A and 16B are connected to the main control board 18 with wires 21 (see FIG. 4) passing through wiring conduits 20 provided in housings 19A and 19B of the first and second pressure sensors 12A and 12B. External wiring 22 is connected to one of the specific control boards 16A and 16B or to the main control board 18. In the configuration example shown in FIG. 4, the external wiring 22 includes a power supply line 22a and a flow-rate-signal output line 22b and is connected to the main control board 18. In FIG. 1, the wiring conduits 20 of the second pressure sensor 12B are shown by the broken lines, and the wiring conduits of the first pressure sensor 12A are not shown.

The main control board 18 includes a power circuit part 18a, a pressure-difference sensing part 18b, a flow-rate converting part 18c, and a signal-outputting part 18d.

The power circuit part 18a is a circuit that is externally supplied with power through the power supply line 22a and that supplies the power to the main control board 18, the specific control boards 16A and 16B, and the pressure sensor elements 15A and 15B.

The pressure-difference sensing part 18b receives the measured pressures from the pressure sensor elements 15A and 15B to determine the pressure difference across the orifice member 11.

The flow-rate converting part 18c converts the pressure difference determined by the pressure-difference sensing part 18b into the flow rate of the fluid flowing through the flow channel 13 by arithmetic processing.

The signal-outputting part 18d feeds the flow rate fed from the flow-rate converting part 18c to an apparatus control sequencer CU through the flow-rate-signal output line 22b. The apparatus control sequencer CU corresponds to, for example, the control unit 7 of the flow control device 5.

The specific control boards 16A and 16B are electrically connected to the power circuit 18a through the wires 21 and are supplied with power therefrom. The specific control boards 16A and 16B are also electrically connected to the pressure sensor elements 15A and 15B, respectively, through wires 23. Thus, the pressure sensor elements 15A and 15B are supplied with power from the power circuit part 18a through the specific control boards 16A and 16B, respectively, and feed minute signals for the measured pressures to the specific control boards 16A and 16B, respectively. The measured pressures are amplified by the sensor-amplifier function of the specific control boards 16A and 16B and are fed to the pressure-difference sensing part 18b through the wires 21.

The pressure sensor elements 15A and 15B used are, for example, strain gauges including diaphragms. Because the pressure sensor elements 15A and 15B output the measured pressures as minute signals, the specific control boards 16A and 16B, having the sensor-amplifier function to amplify the minute signals, are separated from the main control board 18 and are disposed as close to the respective pressure sensor elements 15A and 15B as possible.

The structure of the first and second pressure sensors 12A and 12B will be briefly described.

The first pressure sensor 12A includes a cap 24A attached to the top of the housing 19A, in which the flow channel 13 is formed, to form an accommodation/installation space 25A for the pressure sensor element 15A and the specific control board 16A. An O-ring 26 is disposed between the fitted portions of the housing 19A and the cap 24A, and an O-ring 26 is also interposed on the flow channel 13 side of the pressure sensor element 15A to seal the accommodation/installation space 25A in a liquid-tight manner.

In addition, a trimmer TR for adjustment of the pressure sensor element 15A is installed in the accommodation/installation space 25A. Therefore, the cap 24A has a through-hole, for adjustment of the trimmer TR, to which a seal cap 27 is attached in a liquid-tight manner.

The cap 24A also has a cable nut 28 for connecting the external wiring 22. The cable nut 28 is provided with a cable gasket 29 through which the external wiring 22 is passed in a liquid-tight manner.

This structure can seal the accommodation/installation space 25A where electrical components such as the specific control board 16A are installed in a liquid-tight manner to prevent intrusion of liquid.

The second pressure sensor 12B has the same liquid-tight structure as the first pressure sensor 12A except that the external wiring 22 is not connected. In the figure, reference numeral 24B denotes a cap, and reference numeral 25B denotes an accommodation/installation space.

Connection portions of the first and second pressure sensors 12A and 12B are connected and fixed to those of the liquid transport pipe P in a liquid-tight manner by fastening cap nuts 30 so that they press the pipe ends against the housings 19A and 19B.

Likewise, connection portions of the housings 19A and 19B of the first and second pressure sensors 12A and 12B are connected and fixed to those of the orifice member 11 in a liquid-tight manner by fastening orifice cap nuts 31.

The first and second pressure sensors 12A and 12B, connected and combined together with the orifice member 11 disposed therebetween, are fixed to the base member 14 using, for example, screws 32. This results in formation of the wiring conduits 20, which extend from near the first and second pressure sensors 12A and 12B to the board installation space 17 of the base member 14. O-rings 26 are disposed at the joints between the bottom surfaces of the housings 19A and 19B and the base 14 to seal the wiring conduits 20 in a liquid-tight manner. The housings 19A and 19B each include four wiring conduits 20 through which the necessary wires 21 are passed separately. This results in a reduction in the diameter of each wiring conduit 20. Hence, the shape of the housings 19A and 19B can be utilized effectively, and the wiring conduits can be formed without using large housings.

A lid member 33 is detachably/attachably attached to the bottom surface of the base member 14 with screws 34 so that the board installation space 17, formed by hollowing the base member 14, can be opened and closed. The lid member 33 is attached to the base member 14 in a liquid-tight manner by applying a sealant (not shown) to the joint therebetween. In addition, the vicinities of the heads of the screws 34, used to attach the lid member 33, are covered with rubber caps 35, for example, in a liquid-tight manner.

This structure can seal the board installation space 17 where the main control board 18, which is an electrical component, is installed in a liquid-tight manner to prevent intrusion of liquid. If the base member 14 is formed of a material with low thermal conductivity (for example, a fluorocarbon resin), the main control board 18 is thermally insulated from the fluid flowing through the flow channel 13 and is therefore not affected by the fluid temperature.

The differential-pressure flow meter 1 satisfies the relationship represented by Equation (1):

$$Q = k\sqrt{(P1-P2)} \qquad (1)$$

where P1 is the fluid pressure on the upstream side of the orifice member 11, P2 is the fluid pressure on the downstream side of the orifice member 11, and Q is the flow rate of the fluid supplied to the orifice member 11. Based on this equation, the flow-rate converting part 18c converts the pressure difference to a flow rate.

The proportionality coefficient, k, of Equation (1) is a constant depending on the shape and diameter of the orifice and can be determined by actual measurement.

In the differential-pressure flow meter 10 thus configured, the main control board 18 combines the control function that would be implemented by the controller CR in the conventional art and the control function common to the first and second pressure sensors 12A and 12B. This allows the nearby specific control boards 16A and 16B to carry only the minimum control function required separately for the first and second pressure sensors 12A and 12B, that is, the amplifier function for amplifying minute signals. The overall size of the differential-pressure flow meter 10 can therefore be reduced because the controller CR, conventionally a discrete component, is integrated into the main control board 18 and is therefore no longer required, and because the main control board 18 is installed in the board installation space 17 formed inside the base member 14.

In addition, the board installation space 17 in which the main control board 18, which is an electrical component, is installed has a liquid-tight structure that prevents intrusion of a liquid, such as water, because the board installation space 17 is provided under the bottom surface of the base member 14 in a liquid-tight manner, and because the first and second pressure sensors 12A and 12B are joined to the top surface of the base member 14 so that the wiring conduits 20 are sealed from the outside in a liquid-tight manner.

Also, the plurality of separate wiring conduits 20 is provided to reduce the cross-sectional area of each wiring conduit 20 and increase the number of the wiring conduits 20, thereby ensuring the necessary cross-sectional area of the wiring conduits 20. Thus, the plurality of wiring conduits 20 with a small diameter is provided while effectively utilizing the thickness of the members constituting the housings 19A and 19B. This contributes to a reduction in the size of the differential-pressure flow meter 10.

Figure 5:
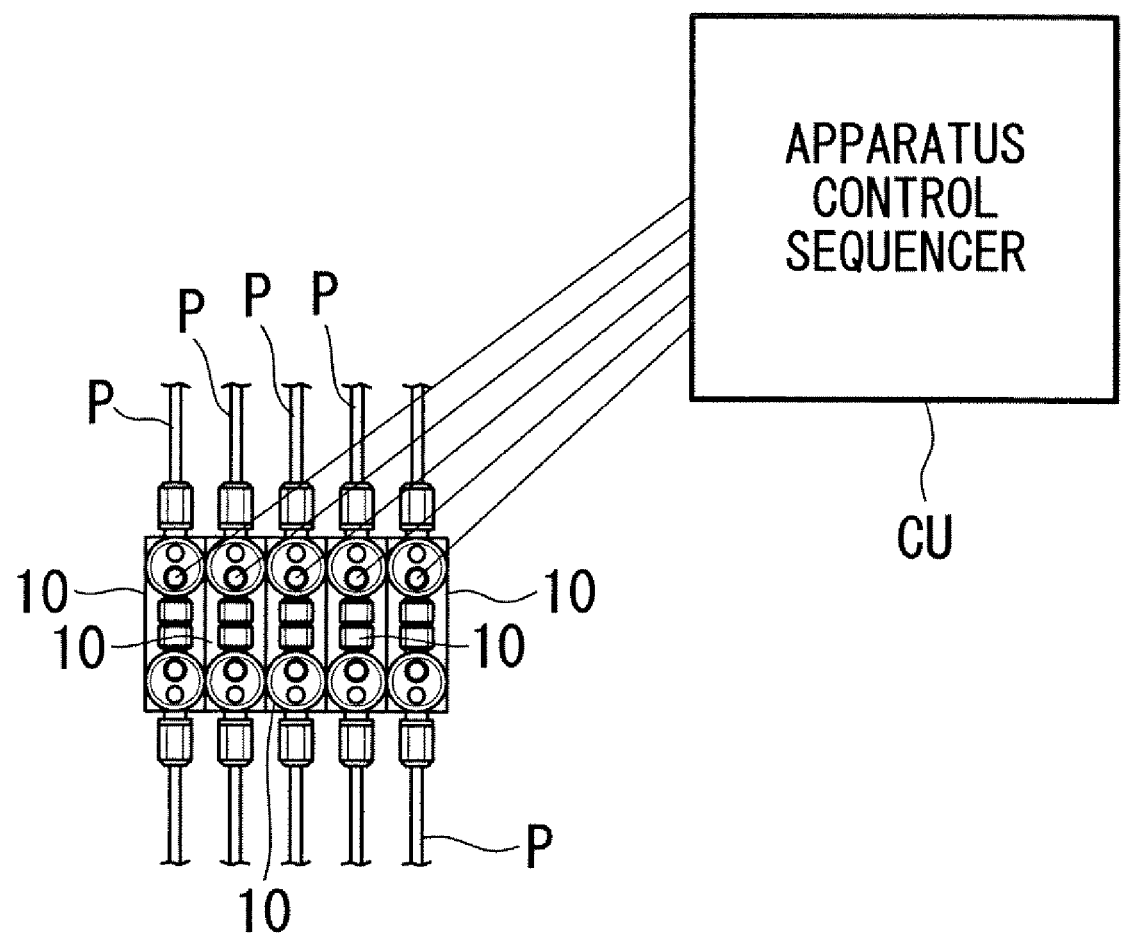
FIG. 5 is a plan view showing a configuration example where many differential-pressure flow meters according to the present invention are used side by side in an apparatus.

Referring to FIG. 5, the use of many differential-pressure flow meters 10 (five in the example shown) arranged in parallel for a semiconductor manufacturing apparatus, for example, reduces the installation space because they are compact, and also eliminates the installation space conventionally required for the controller CR, so that sufficient installation space can be readily ensured. This increases the flexibility of layout and contributes to a reduction in the overall size of the apparatus.

In the differential-pressure flow meter 10 of the present invention, specifically, the specific control boards 16A and 16B are disposed near the pressure sensor elements 15A and 15B, respectively, and the main control board 18 is disposed in the board installation space 17. The two specific control boards 16A and 16B are connected to the main control board 18 with the wires 21 passing through the wiring conduits 20, and the external wiring 22 is connected to one of the control boards 16A, 16B, and 18. The main control board 18 combines the control function of the controller CR that is conventionally required, namely, the control function of a discrete controller, and the control function common to the first and second pressure sensors 12A and 12B. This allows the specific control boards 16A and 16B to carry only the minimum control function required separately for the first and second pressure sensors 12A and 12B, so that the size of the differential-pressure flow meter 10 can be reduced and sufficient installation space can readily be ensured.

In other words, not only can the size of the differential-pressure flow meter 10 itself be reduced, but also the discrete controller CR can be integrated into the main control board 18 and is therefore no longer required. If the differential-pressure flow meter 10 is installed in equipment such as a semiconductor manufacturing apparatus, its compact installation space allows the size of the equipment to be reduced. In addition, the number of steps involved in the installation operation can be reduced because the number of components and the steps in wiring operation, for example, can be reduced.

The orifice member 11 is removably installed between the first and second pressure sensors 12A and 12B.

In the configuration example shown in FIG. 1, the orifice member 11 is detachably/attachably connected between the first and second pressure sensors 12A and 12B using the pair of orifice cap nuts 31 held on the orifice body 11 to form an orifice flow channel coaxial with and narrower than the flow channel 13. Preferably, the orifice member 11 is formed of a material with resistance to contamination and corrosion by the fluid flowing through the inner flow channel, for example, a copolymer of tetrafluoroethylene and perfluoroalkoxyethylene (PFA).

In addition, the orifice member 11 has slopes on the two sides of the narrow orifice flow channel to smoothly guide the fluid into the orifice flow channel and to squeeze the fluid out of the orifice flow channel to the downstream side without retention. The fluid is therefore less likely to be retained at the boundary between the first and second pressure sensors 12A and 12B.

The removable orifice member 11 described above is not limited to the embodiment shown in FIG. 1; various embodiments and modifications are available as described below.

First Embodiment

Figure 7:
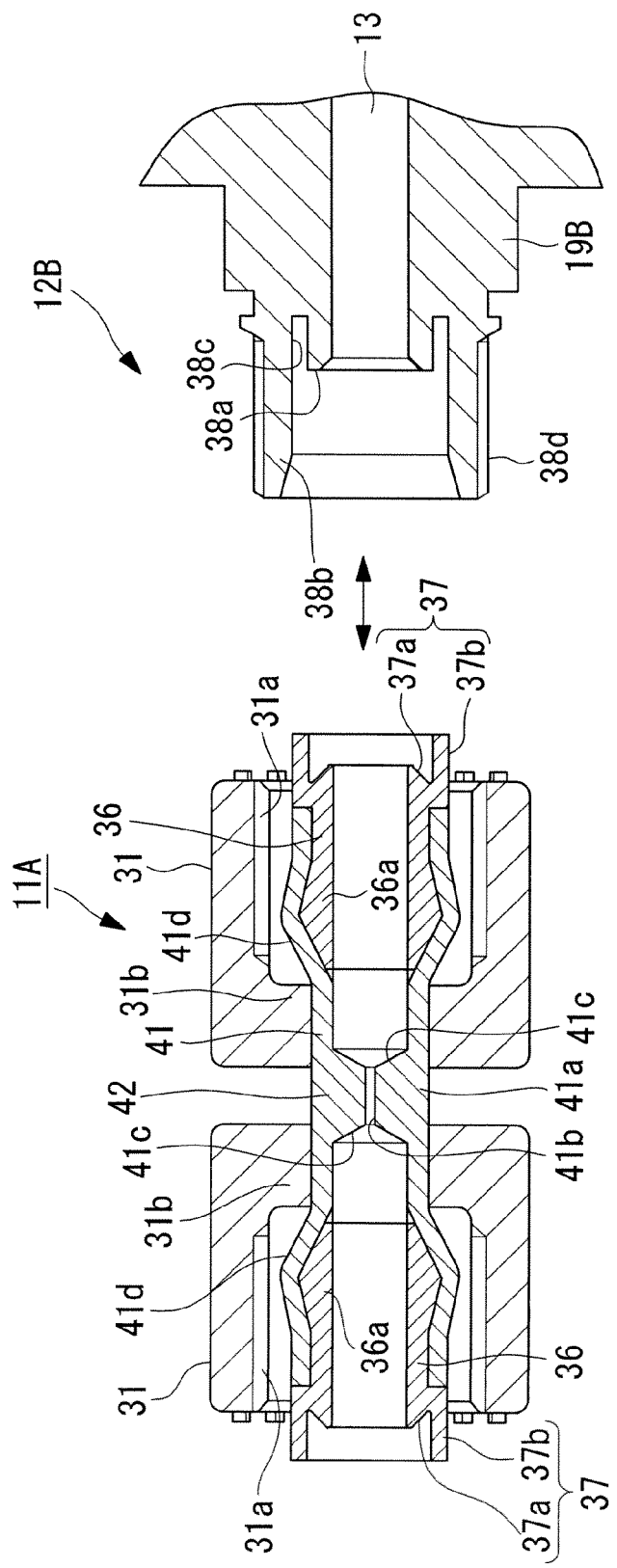
FIG. 7 is a longitudinal sectional view showing a first embodiment related to a configuration example of an orifice member.
Figure 8:
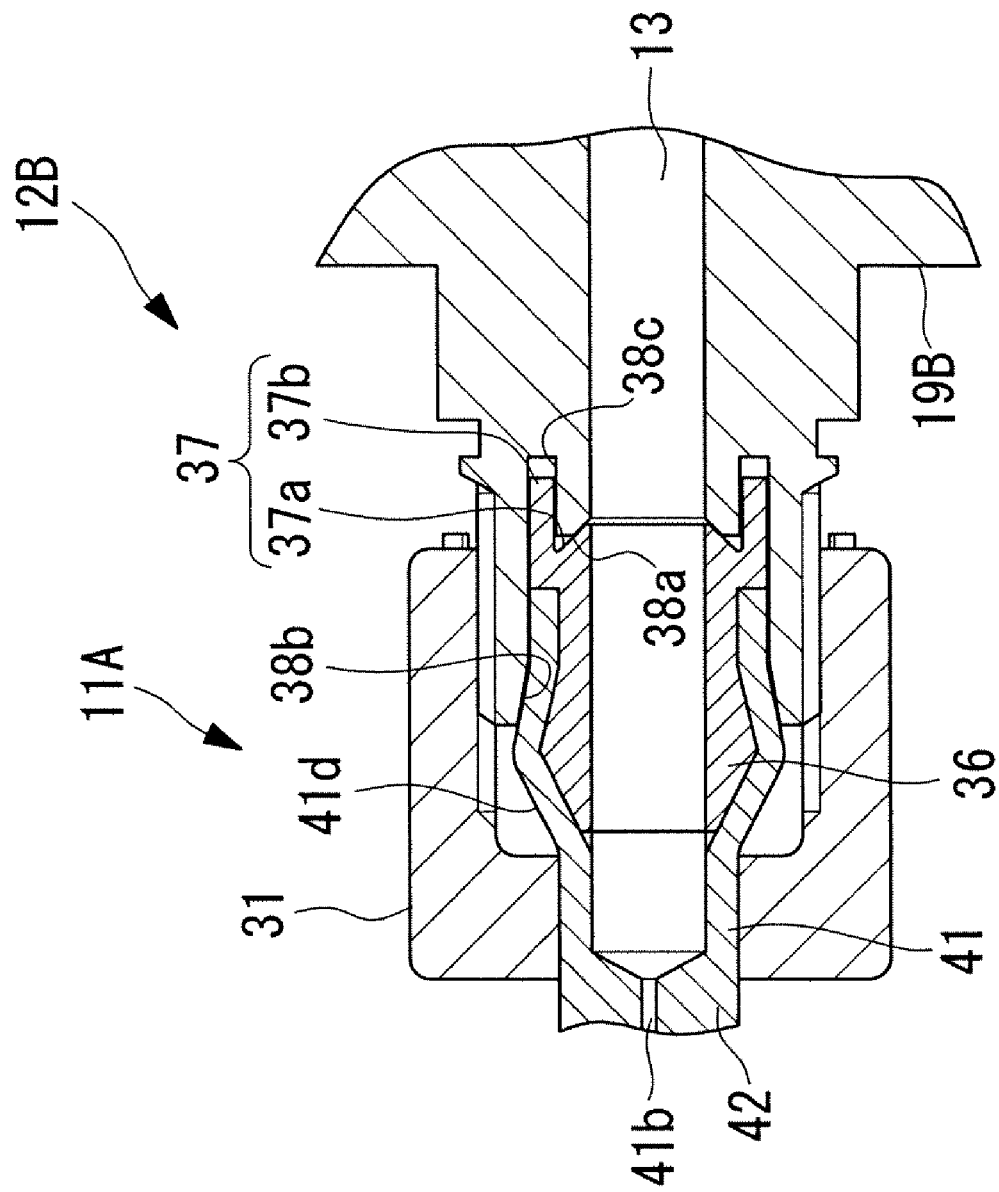
FIG. 8 is a longitudinal sectional view of a main part of the orifice member of FIG. 7, showing the state where the orifice member is connected to a pressure sensor.

An orifice member 11A of a first embodiment shown in FIGS. 7 and 8 integrally includes a tube portion 41 which has one end connected to the first pressure sensor 12A and the other end connected to the second pressure sensor 12B and in which a flow channel is formed so as to connect the first and second pressure sensors 12A and 12B and an orifice 42 provided in the tube portion 41.

In the example shown, the orifice member 11A has a substantially cylindrical shape with only the center 41a of the tube portion 41 in the longitudinal direction being solid. A hole 41b of the orifice flow channel extending from one end to the other end of the tube portion 41 is formed in the center 41a in the longitudinal direction so as to be coaxial with the axis of the tube portion 41. The center 41a in the longitudinal direction thus forms the orifice 42.

That is, the tube portion 41 and the orifice 42 are formed as a single member, and the orifice member 11A has no seam that can cause fluid retention between the tube portion 41 and the orifice 42.

Accordingly, with the orifice member 11A, when the fluid supplied into the flow channel is changed, a fluid newly supplied into the flow channel can reliably squeeze the residual fluid out of the flow channel, so that the fluid in the flow channel can be quickly replaced.

In addition, because the tube portion 41 and the orifice 42 are integrally formed, the orifice member 11A can reduce the number of components, can readily be produced, and eliminates the need to dispose a member, such as an O-ring, that can cause contamination in the flow channel.

This orifice member 11A can be formed by, for example, injection molding using a mold, or by mechanical processing (such as cutting).

The inner surfaces of the tube portion 41 and the hole 41b are joined by tapered surfaces 41c tapered from the ends of the tube portion 41 in the longitudinal direction toward the center in the longitudinal direction. That is, the surfaces between the inner surfaces of the tube portion 41 and the hole 411b are sloped along the flow of the fluid in the tube portion 41 to smoothly guide the fluid reaching the center 41a of the tube portion 41 in the longitudinal direction into the hole 41b and to squeeze the fluid out of the hole 41b to the downstream side without retention. The fluid is therefore less likely to be retained at the boundary between the orifice 42 and the tube portion 41.

The ends of the tube portion 41 are provided with the orifice cap nuts 31, in which the ends of the tube portion 41 are inserted, and sleeves 36 inserted in the ends of the tube portion 41 to widen portions of the tube portion 41 near the ends thereof radially outward so that large-diameter portions 41d are formed at the ends of the tube portion 41.

The orifice cap nuts 31 have female threaded portions 31a formed in inner circumferential surfaces thereof and engagement flanges 31b disposed closer to the center 41a of the tube portion 41 in the longitudinal direction than the female threaded portions 31a and protruding inward in the radial direction of the orifice cap nuts 31 so as to engage with the large-diameter portions 41d. In this modification, the engagement flanges 31b are inward flanges formed around the entire inner circumferences of the orifice cap nuts 31.

The sleeves 36, which are substantially cylindrical members in which flow channels are formed, are inserted in the tube portion 41 with their ends protruding from the ends of the tube portion 41.

The sleeves 36 have engaging portions 37 at the ends protruding from the ends of the tube portion 41 (hereinafter referred to as "protruding ends"). These engaging portions 37 have such a shape that they engage with connection ends of the first and second pressure sensors 12A and 12B. In this case, the engaging portions 37 have substantially annular abutment surfaces 37a that surround opening ends of the flow channels of the sleeves 36 and that come in surface contact with end surfaces of the connection ends of the first and second pressure sensors 12A and 12B and cylindrical portions 37b provided so as to protrude farther than and surround the abutment surfaces 37a.

The sleeves 36 also have large-diameter portions 36a formed at the ends inserted in the tube portion 41 to widen the tube portion 41 radially outward.

In FIG. 7, the second pressure sensor 12B includes the housing 19B, in which the flow channel 13 is formed so as to connect the fluid transport pipe P to the orifice member 1 1A, and the pressure sensor element 15B (not shown) for measuring the pressure of the fluid in the housing 19B.

The housing 19B has a substantially annular abutment surface 38a that is provided at the end of the inner flow channel where the orifice member 11A is connected so as to surround an opening end of the flow channel and that comes in surface contact with the abutment surface 38a of the sleeve 36 of the orifice member 11A; a cylindrical portion 38b provided so as to protrude farther than and surround the abutment surface 38a; and an annular groove 38c which is provided between the abutment surface 38a and the cylindrical portion 38b and into which the cylindrical portion 37b of the orifice member 11A is inserted.

A male threaded portion 38d is formed in the outer circumferential surface of the cylindrical portion 38b and is screwed into the female threaded portion 31a of the orifice cap nut 31 of the orifice member 11A.

For the orifice member 11A thus configured, one end of the tube portion 41 in the longitudinal direction is disposed opposite the connection end of the flow channel of the second pressure sensor 12B, and the orifice cap nut 31 in which that end is inserted is allowed to engage with the male threaded portion 38d provided on the cylindrical portion 38b of the housing 19B of the second pressure sensor 12B. As the orifice cap nut 31 is tightened, it causes the engaging portion 37 of the sleeve 36 protruding from that end to become relatively close to the housing 19B together with the orifice cap nut 31. With the orifice cap nut 31 sufficiently tightened, as shown in FIG. 8, the abutment surface 37a constituting the engaging portion 37 of the sleeve 36 is pressed against the abutment surface 38a of the housing 19B to be in surface contact therewith. The cylindrical portion 37b of the engaging portion 37 of the sleeve 36 is inserted into the groove 38c of the housing 19B, so that the engaging portion 37 is fixed to the housing 19B in a gas-tight, liquid-tight engagement.

The fixing of the engaging portion 37 to the housing 19B is released by loosening the orifice cap nut 31.

The connection and separation operations of the orifice member 11A and the first pressure sensor 12A are similar to those of the orifice member 11A and the second pressure sensor 12B.

That is, the orifice member 11A of the differential-pressure flow meter 10 can easily be connected to and separated from the two pressure sensors 12A, 12B by operating the orifice cap nuts 31.

Figure 9:
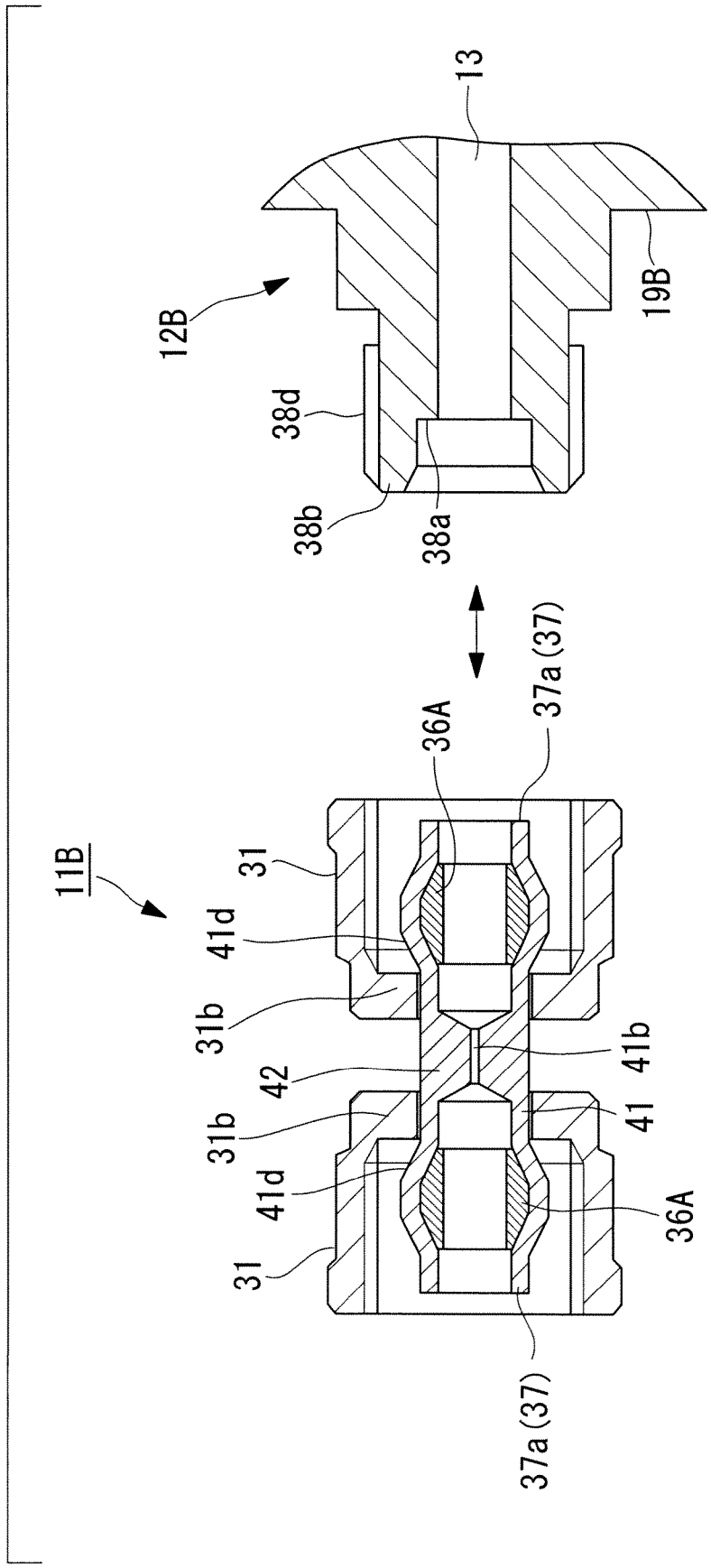
FIG. 9 is a longitudinal sectional view showing a first modification of the orifice member shown in FIG. 7.
Figure 10:
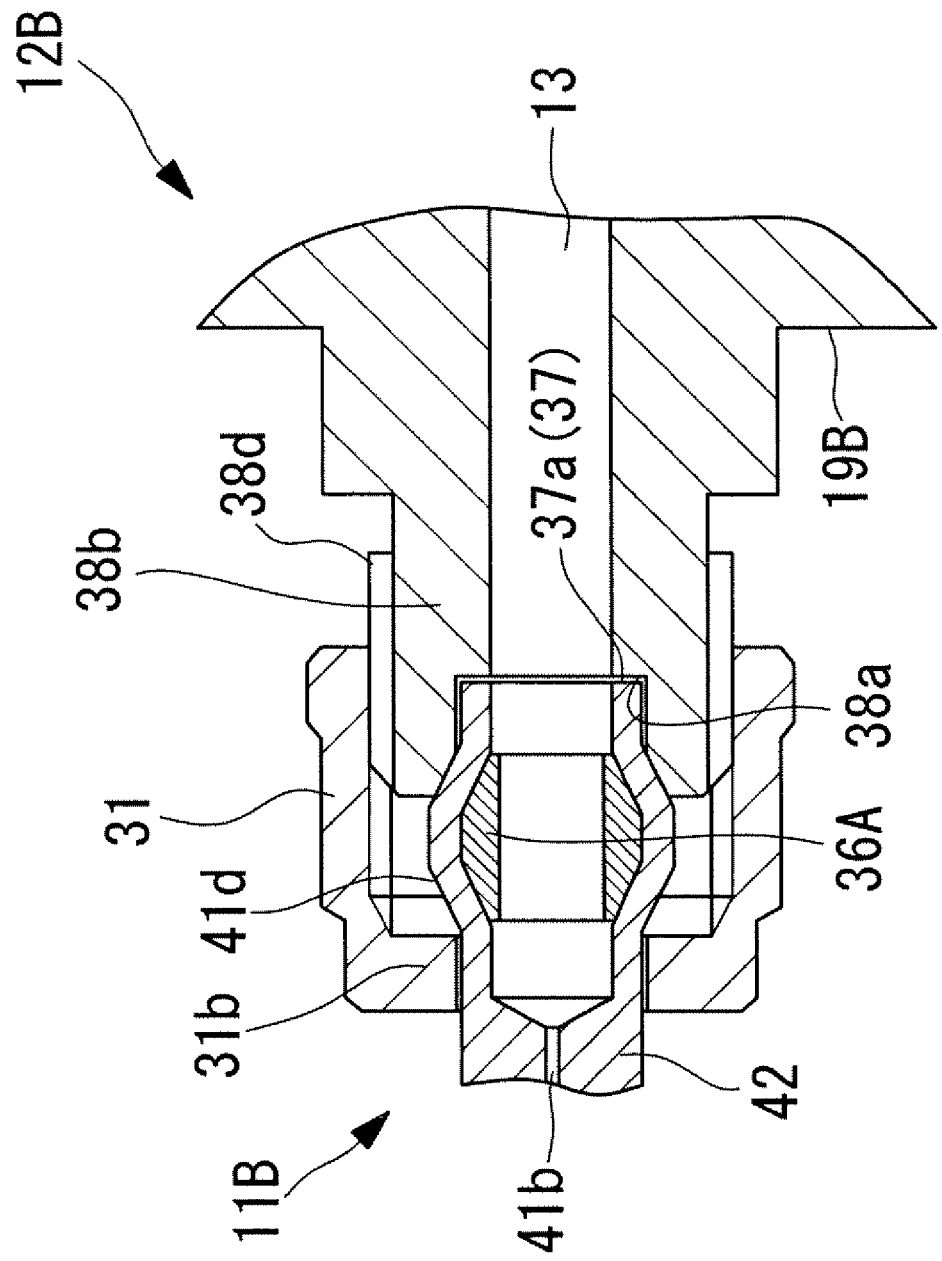
FIG. 10 is a longitudinal sectional view of a main part of the orifice member of FIG. 9, showing the state where the orifice member is connected to a pressure sensor.

Although the sleeves 36 have the engaging portions 37 in the first embodiment described above, they may be replaced with, for example, annular sleeves 36A having no engaging portions 37, as in an orifice member 11B of a first modification shown in FIGS. 9 and 10. The annular sleeves 36A may be inserted into the tube portion 41 past the ends thereof to form the large-diameter portions 41d.

In this case, the ends of the tube portion 41 form the engaging portions 37 (the ends of the tube portion 41 function as the abutment surfaces 37a, with the cylindrical portions 37b omitted). Instead of the housings 31 described above, the first and second pressure 12A and 12B include housings 19B having the same structure as the housings 19A but having no grooves 38c.

Second Embodiment

A second embodiment of the orifice member 11 will now be described with reference to FIGS. 11 and 12.

Figure 11:
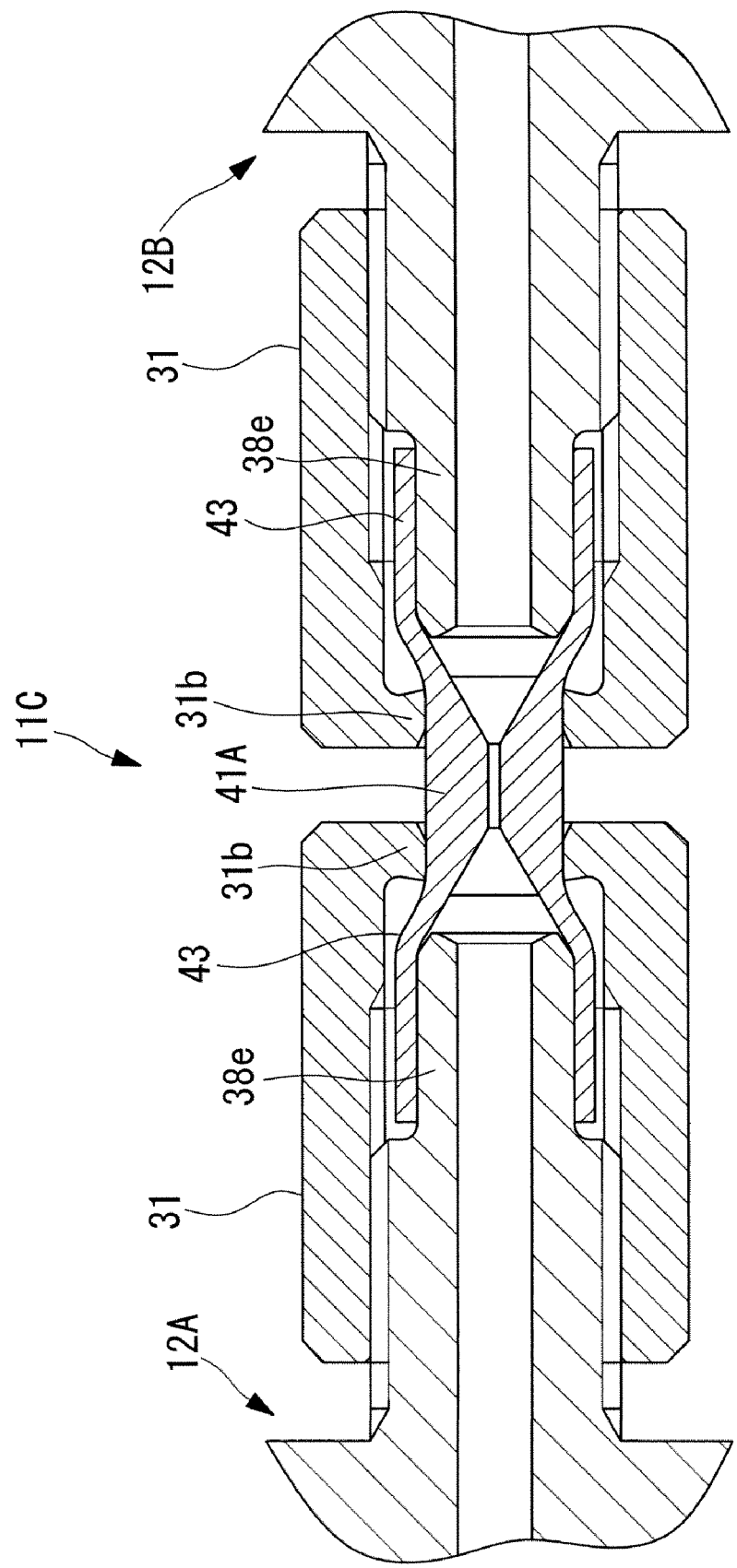
FIG. 11 is a longitudinal sectional view of a second embodiment related to a configuration example of an orifice member, showing the state where the orifice member is connected to a pressure sensor.

In FIG. 11, an orifice member 11C of this embodiment differs in the structure for connection to the first and second pressure sensors 12A and 12B. Members similar or identical to those of the embodiment described above are indicated by the same reference numerals, and a detailed description thereof will be omitted.

Figure 12:
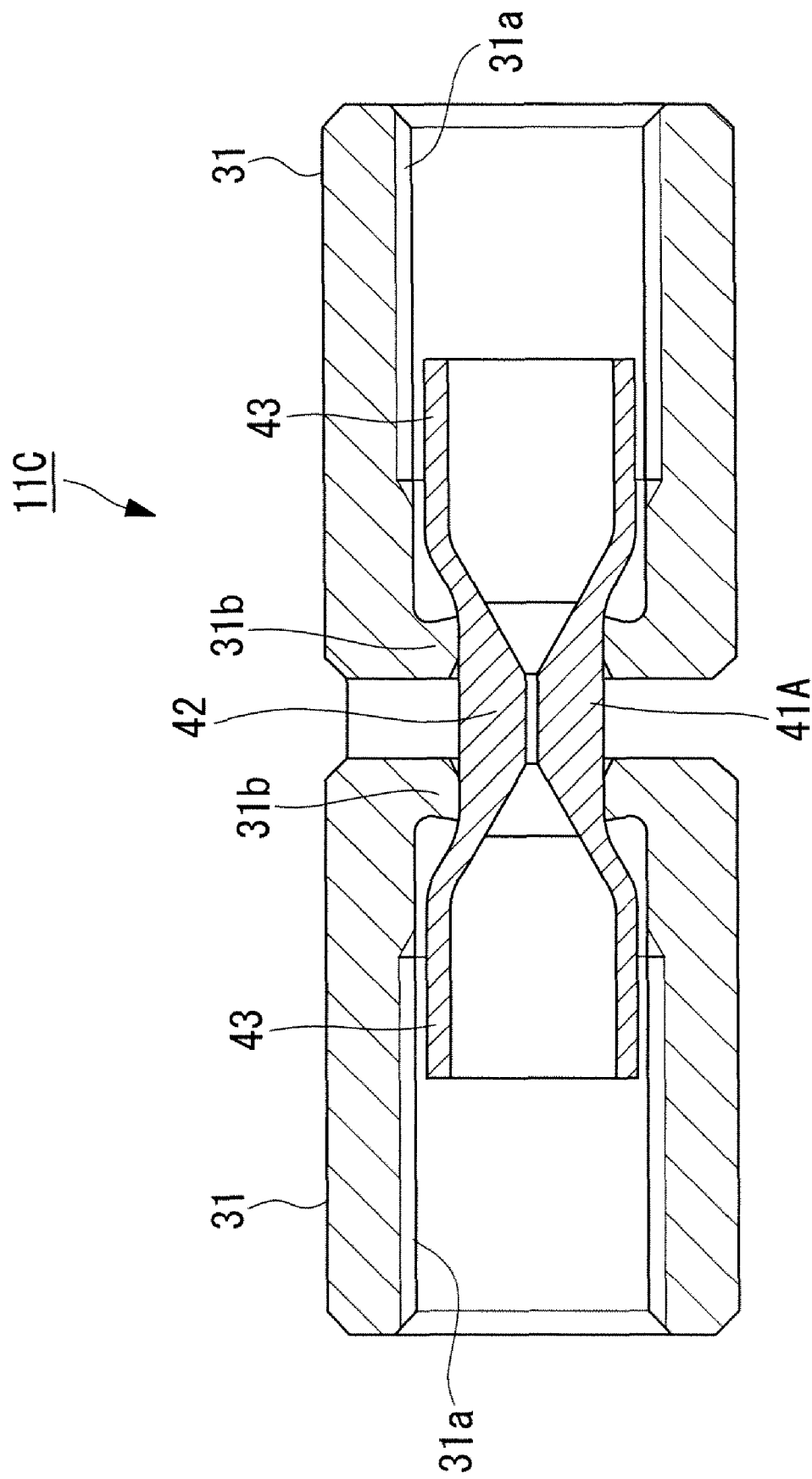
FIG. 12 is a longitudinal sectional view showing the orifice member of FIG. 11.

In FIG. 12, the orifice member 11C is mainly characterized in that the tube portion 41 and the sleeves 36 of the orifice member 11A shown in the first embodiment are replaced with a tube portion 41A having flexible ends, inserted in the orifice cap nuts 31, at which large-diameter portions 43 are formed. The large-diameter portions 43 are larger in diameter than the other portion and are configured to receive the connection ends of the first and second pressure sensors 12A and 12B inside, as described below. The engagement flanges 31b of the orifice cap nuts 31 engage with the large-diameter portions 43.

The ends of the tube portion 41A are flexible and deformable and can therefore be readily inserted into the orifice cap nuts 31.

The first pressure sensor 12A is mainly characterized in that the abutment surface 38a and the groove 38c shown in the first embodiment are omitted, and an insertion portion 38e is provided at the end of the cylindrical portion 38b so as to be inserted into the large-diameter portion 43 of the tube portion 41A. The second pressure sensor 12B has the same structure as the first pressure sensor 12A.

For the differential-pressure flow meter 10 thus configured, the ends of the tube portion 41A of the orifice member 11C are disposed opposite the insertion ends 38e of the first and second pressure sensors 12A and 12B, and the insertion ends 38e are inserted into the large-diameter portions 43 of the tube portion 41A. Thus, the insertion ends 38e are received into the large-diameter portions 43 to regulate the deformation of the large-diameter portions 43 so that they engage with the engagement flanges 31b provided on the inner circumferential surfaces of the orifice cap nuts 31.

With the insertion ends 38e inserted in the large-diameter portions 43, the orifice cap nuts 31 in which the tube portion 41A is inserted are allowed to engage with the male threaded portions 38d provided on the cylindrical portions 38b of the first and second pressure sensors 12A and 12B. As the orifice cap nuts 31 are tightened, they cause the large-diameter portions 43 of the tube portion 41A to become relatively close to the cylindrical portions 38b. With the orifice cap nuts 31 sufficiently tightened, the large-diameter portions 43 of the tube portion 41A are fixed to the insertion portions 38e in a gas-tight, liquid-tight engagement.

The fixing of the ends of the tube portion 41A to the connection ends of the pressure sensors 12A and 12B is released by loosening the orifice cap nuts 31.

That is, the orifice member 11C can easily be connected to and separated from the pressure sensors 12A and 12B by operating the orifice cap nuts 31.

Third Embodiment

Figure 13:
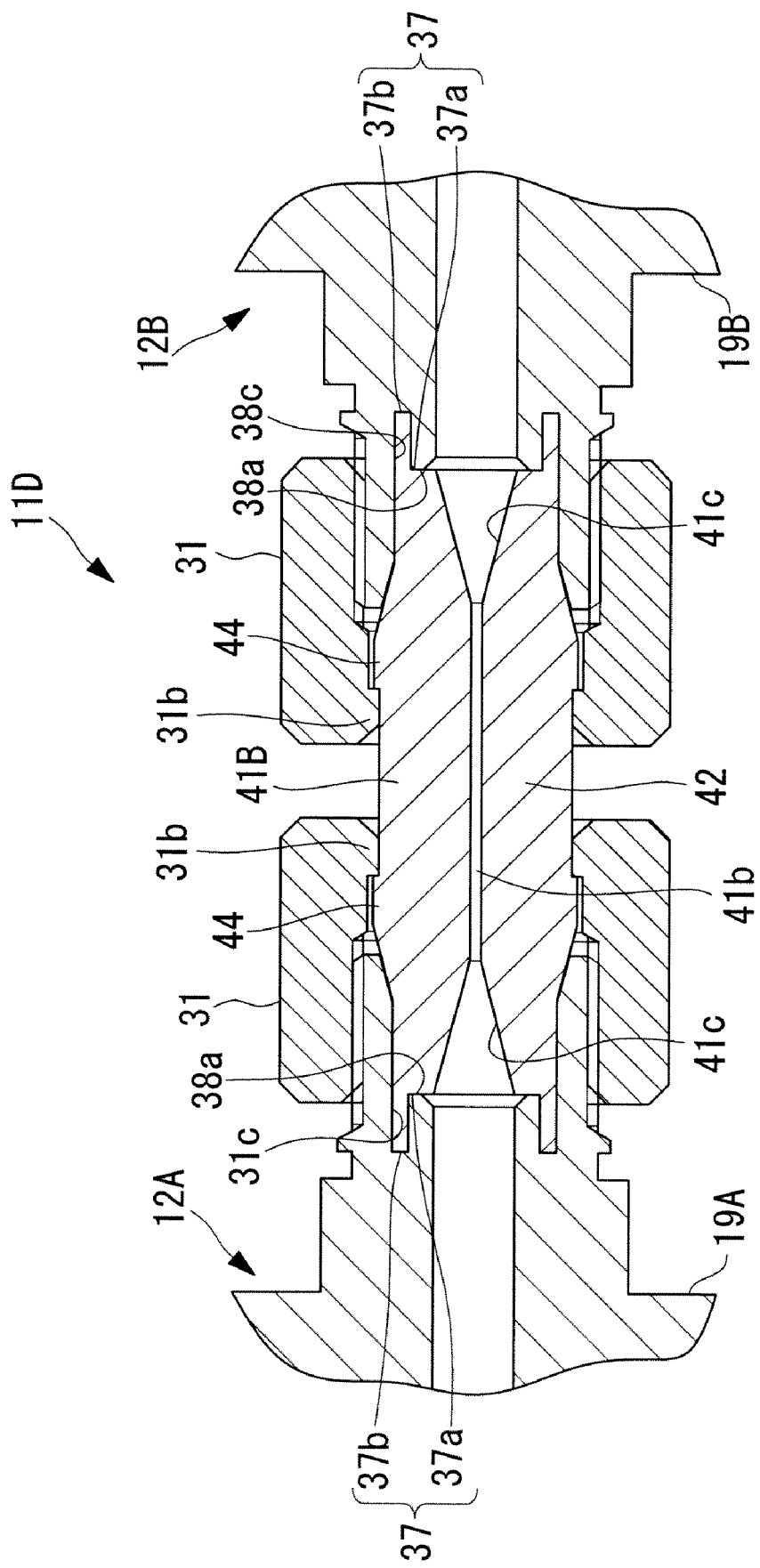
FIG. 13 is a longitudinal sectional view of a third embodiment related to a configuration example of an orifice member, showing the state where the orifice member is connected to a pressure sensor.
Figure 14:
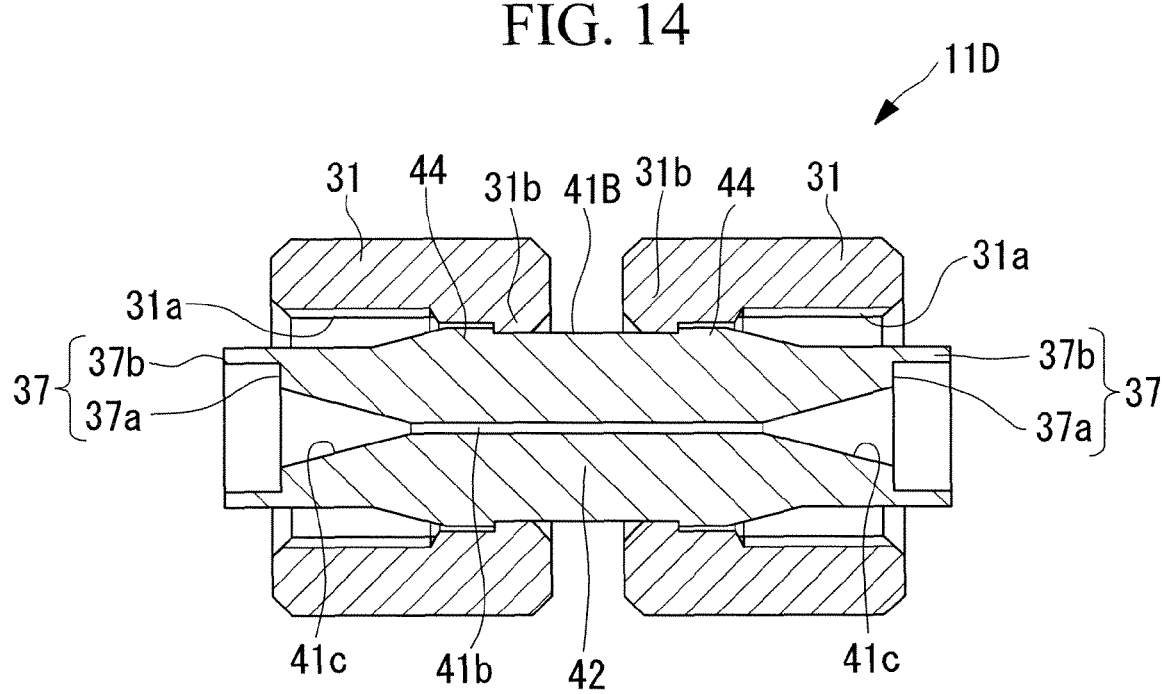
FIG. 14 is a longitudinal sectional view showing the orifice member of FIG. 13.

A third embodiment of the orifice member 11 according to the present invention will now be described with reference to FIGS. 13 and 14.

An orifice member 11D of this embodiment differs from the orifice member 11 shown in the first embodiment in the structure for connection to the first and second pressure sensors 12A and 12B. Members similar or identical to those of the first embodiment are indicated by the same reference numerals, and a detailed description thereof will be omitted.

The orifice member 11D is mainly characterized in that the tube portion 41 and the sleeves 36 of the orifice member 11 shown in the first embodiment are replaced with a tube portion 41B having rigid ends, inserted in the orifice cap nuts 31, at which large-diameter portions 44 are provided in the outer circumferential surfaces. The engagement flanges 31b of the orifice cap nuts 31 engage with the large-diameter portions 44.

Like the sleeves 36 shown in the first embodiment, the abutment surfaces 37a and the cylindrical portions 37b are integrally provided at the ends of the tube portion 41B to constitute the engaging portions 37.

In the orifice member 11D, preferably, at least either the large-diameter portions 44 of the tube portion 41B or the engagement flanges 31b of the orifice cap nuts 31 have such a shape that when the ends of the tube portion 41B are inserted into the orifice cap nuts 31, the orifice cap nuts 31 can easily slide over the large-diameter portions 44 and the tightening of the orifice cap nuts 31 is reliably transferred to the large-diameter portions 44.

In this embodiment, the large-diameter portions 44 of the tube portion 41B have such a shape that the diameter of the large-diameter portions 44 decreases gradually toward the ends of the tube portion 41B and that surfaces substantially perpendicular to the axis are formed in the center of the tube portion 41B in the longitudinal direction.

The engagement flanges 31b of the orifice cap nuts 31 have such a shape that surfaces substantially perpendicular to the axis are formed on the side facing the female threaded portion 31a in the axial direction of the orifice cap nuts 31 and that the diameter of the engagement flanges 31b decreases gradually away from the female threaded portions 31a on the side facing away from the female threaded portions 31a in the axial direction of the orifice cap nuts 31.

The orifice member 11D thus configured is connected to the first and second pressure sensors 12A and 12B in the same procedure as for the orifice member 11 shown in the first embodiment. In addition, the orifice member 11D and the first and second pressure sensors 12A and 12B have the same connection structure as the orifice member 11 and the first and second pressure sensors 12A and 12B in the first embodiment.

Figure 15:
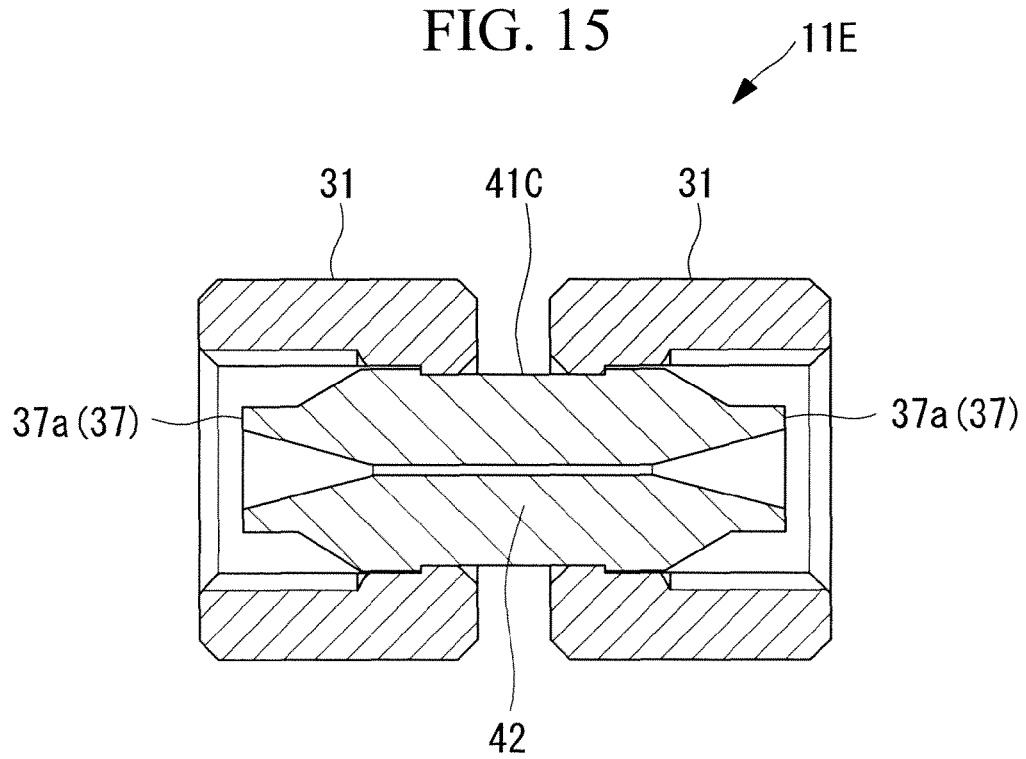
FIG. 15 is a longitudinal sectional view showing a first modification of the orifice member shown in FIG. 13.

In the example shown in this embodiment, the tube portion 41B integrally including the cylindrical portions 37b at its ends is used, although the tube portion used is not limited thereto. For example, a tube portion 41C including no cylindrical portions 37b may be used, as in a first modification shown in FIGS. 15 and 16.

Figure 16:
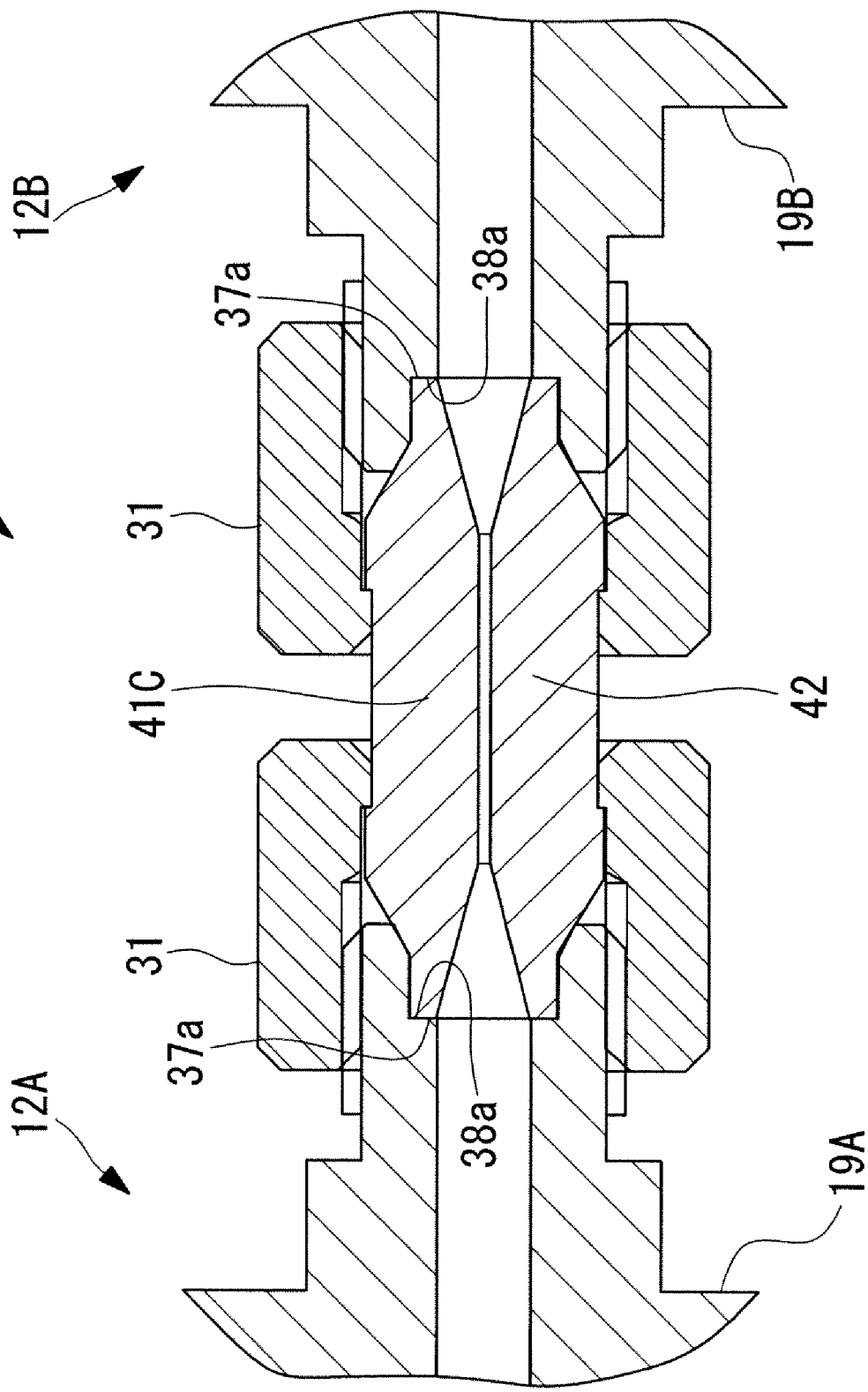
FIG. 16 is a longitudinal sectional view showing the state where the orifice member of the first modification shown in FIG. 15 is connected to a pressure sensor.

In this case, the grooves 38c can be omitted from the respective housings 19A and 19B of the first and second pressure sensors 12A and 12B, as shown in FIG. 16.

Fourth Embodiment

Figure 17:
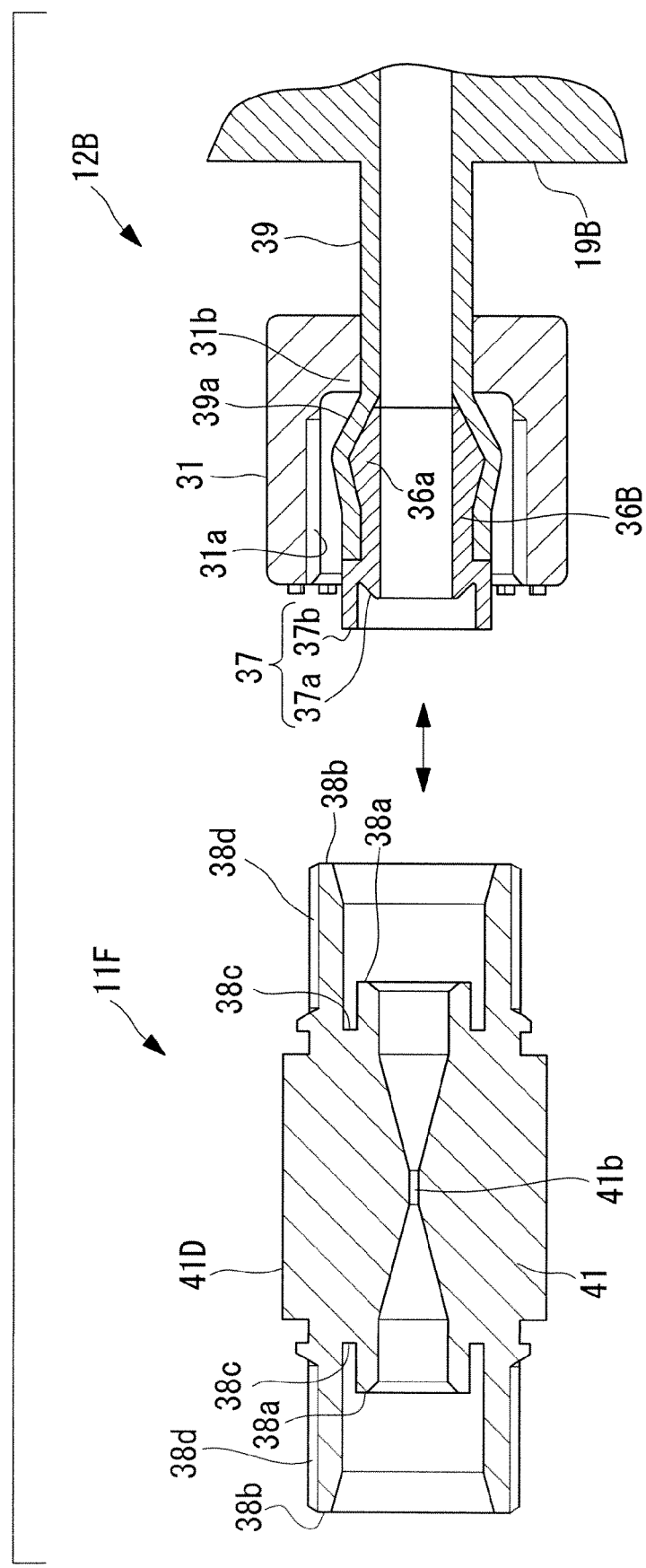
FIG. 17 is a longitudinal sectional view of a fourth embodiment related to a configuration example of an orifice member.

A fourth embodiment of the orifice member 11 according to the present invention will now be described with reference to FIG. 17.

An orifice member 11F of this embodiment differs in the structure for connection to the first and second pressure sensors 12A and 12B.

The orifice member 11F is mainly characterized in that the structures of the connection portions of the orifice member 11 shown in the first embodiment and the first and second pressure sensor 12A and 12B are interchanged with each other. Specifically, the orifice member 11F is mainly characterized in that the orifice cap nuts 31 and the sleeves 36 are omitted from the orifice member 11 shown in the first embodiment and that the tube portion 41 is replaced with a tube portion 41D having the structure shown in FIG. 17.

As compared with the tube portion 41 shown in the first embodiment, the tube portion 41D has two rigid ends, each having a substantially annular abutment surface 38a surrounding an opening end of a flow channel, a cylindrical portion 38b provided so as to protrude farther than the abutment surface 38a in the axial direction and to surround the abutment surface 38a, and an annular groove 38c provided between the abutment surface 38a and the cylindrical portion 38b. A male threaded portion 38d is formed in the outer circumferential surface of the cylindrical portion 38b.

Instead of the abutment surfaces 38a, the cylindrical portions 38b, the grooves 38c, and the male threaded portions 38d shown in the first embodiment, the first and second pressure sensors 12A and 12B include tube portions 39 extending from the housings 19A and 19B, orifice cap nuts 31 in which ends of the tube portions 39 are inserted, and sleeves 36B inserted in the ends of the tube portions 39 to widen portions of the tube portions 39 near the ends thereof radially outward so that large-diameter portions 39a are formed at the ends of the tube portions 39.

As in the first embodiment, the sleeves 36B include engaging portions 37 having substantially annular abutment surfaces 37a that surround opening ends of flow channels of the sleeves 36B and that come in surface contact with end surfaces of the connection ends of the tube portion 41D and cylindrical portions 37b provided so as to protrude farther than and surround the abutment surfaces 37a.

The orifice member 11F thus configured is connected to the first and second pressure sensors 12A and 12B by the same connection method as used in the first embodiment (except that the male-female relationship of the connection structure is reversed).

Figure 18:
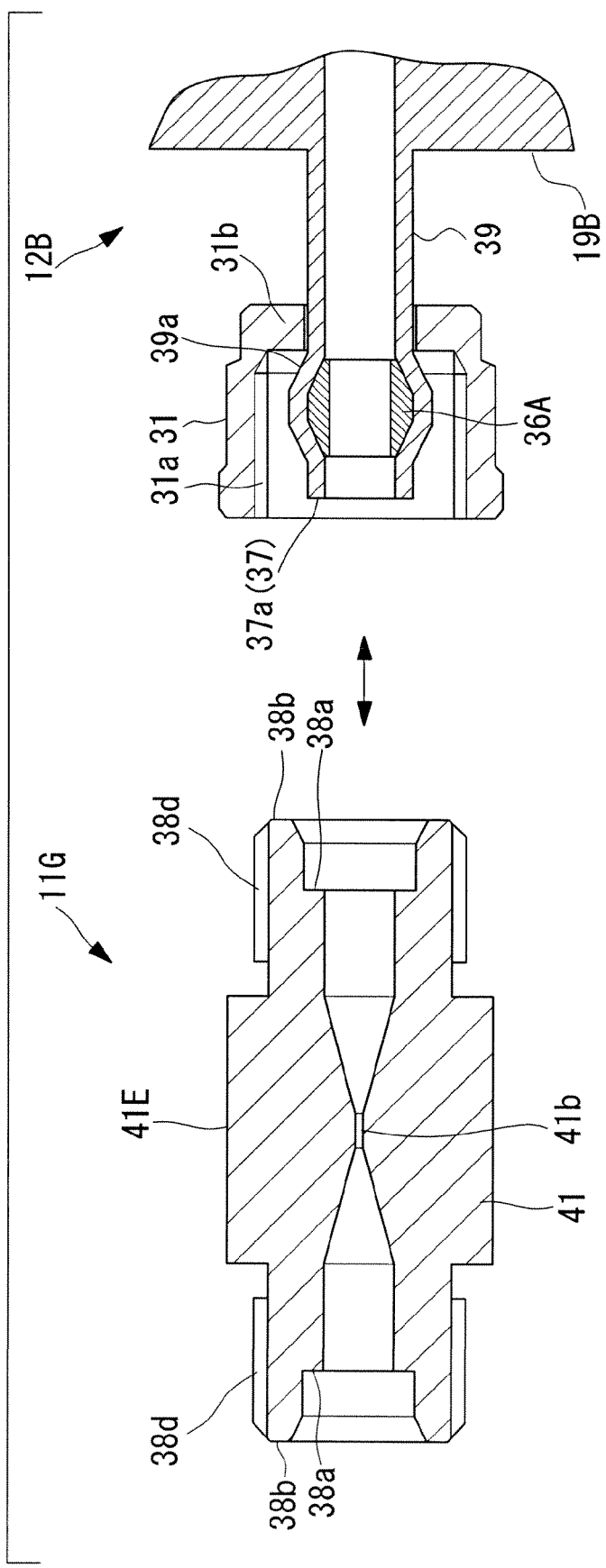
FIG. 18 is a longitudinal sectional view showing a first modification of the orifice member shown in FIG. 17.

In this embodiment, the orifice member 11F may include a tube portion 41E, rather than the tube portion 41D, having a structure in which the grooves 38c are omitted from the tube portion 41E, as in a first modification shown in FIG. 18.

In this case, the first and second pressure sensors 12A and 12B include annular sleeves 36A, having no engaging portions 37, inserted in the tube portions 39 past the ends thereof to form the large-diameter portions 39a in the tube portions 39. In addition, the ends of the tube portions 39 form the engaging portions 37 (the ends of the tube portions 96 function as the abutment surfaces 37a, with the cylindrical portions 37b omitted).

Figure 19:
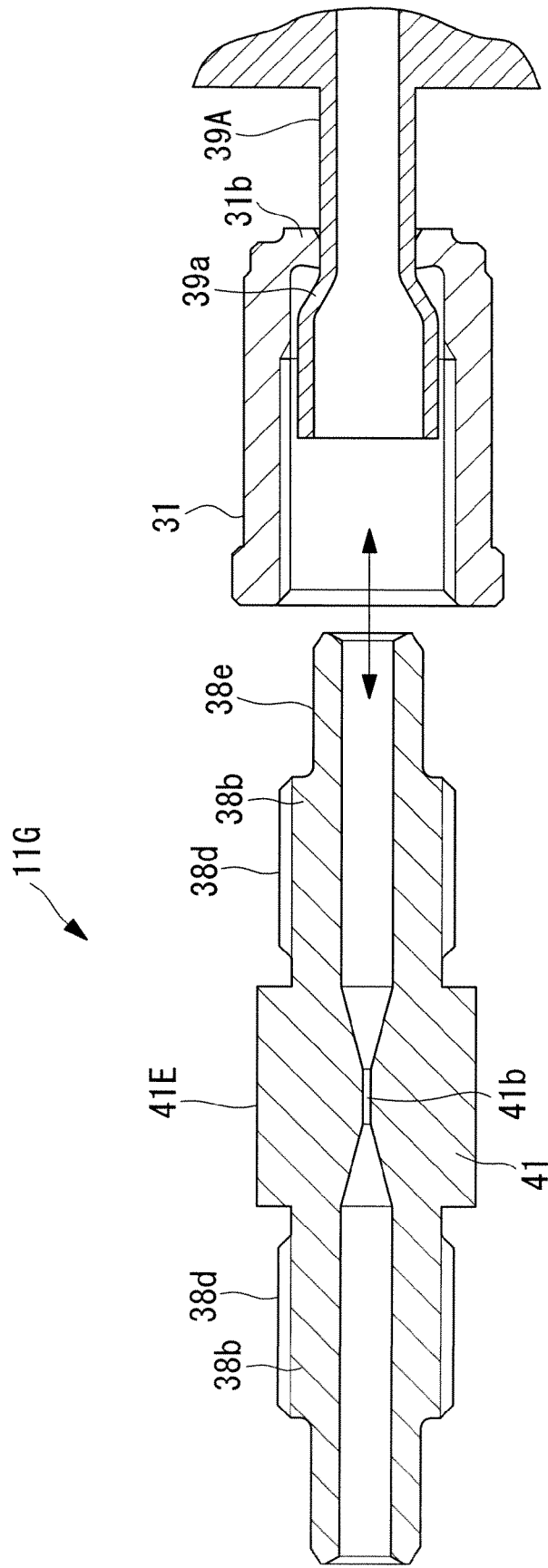
FIG. 19 is a longitudinal sectional view showing a second modification of the orifice member shown in FIG. 17.
Figure 20A:
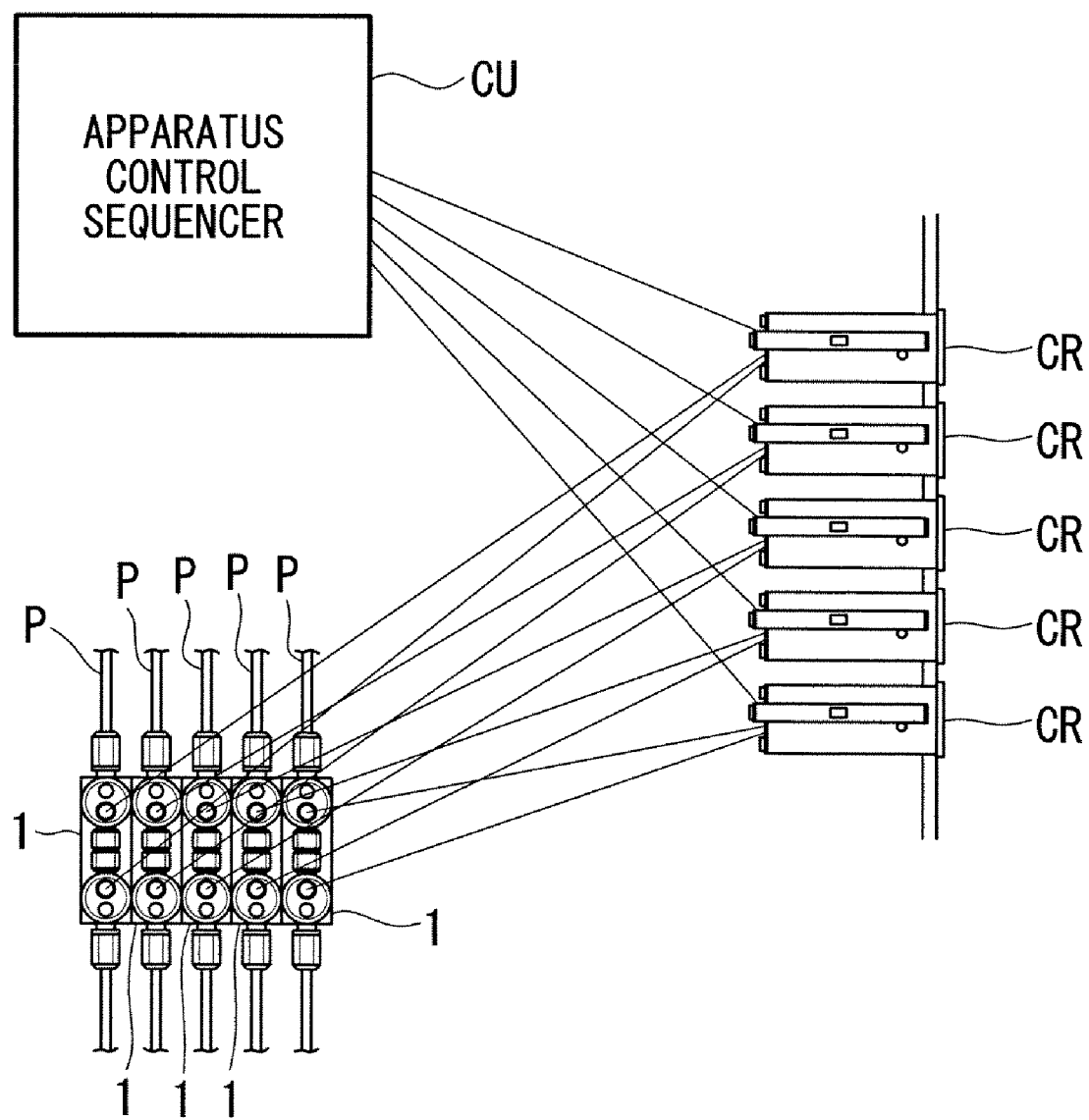
FIG. 20 shows diagrams illustrating the conventional art: 20A is a plan view showing a configuration example where many conventional differential-pressure flow meters are used side by side in an apparatus; and 20B is a block diagram showing the configuration of a conventional differential-pressure flow meter.
Figure 20B:
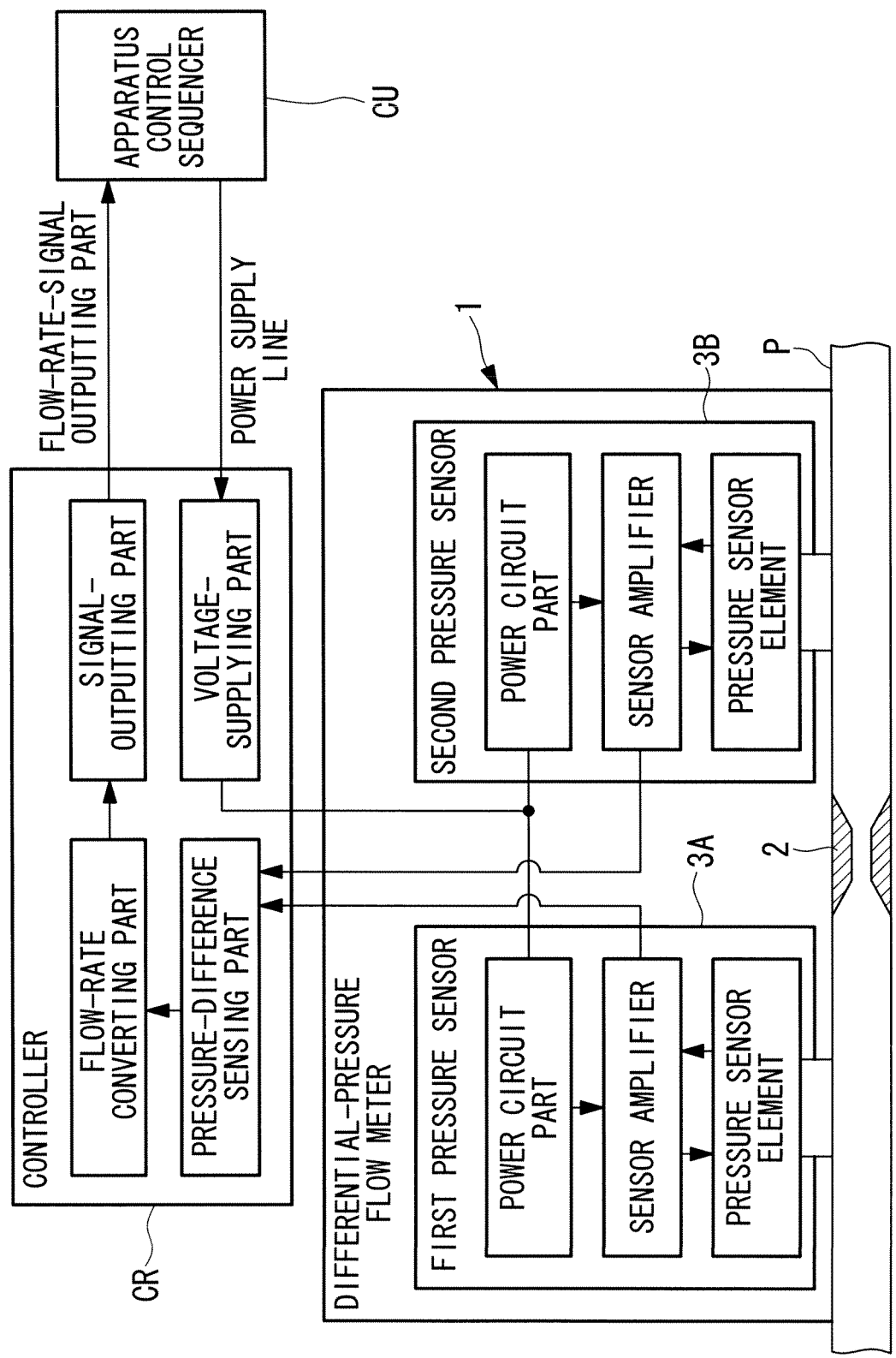

In this embodiment, the orifice member 11G may also include a tube portion 41G, rather than the tube portion 41D, having a structure in which the abutment surfaces 38a and the grooves 38c are omitted from the tube portion 41D and in which insertion portions 38e are provided at the ends of the cylindrical portions 38b so as to be inserted into the large-diameter portions 39a of the tube portions 39, as in a second modification shown in FIG. 19.

In this case, the first and second pressure sensors 12A and 12B do not include the sleeves 36B, but include tube portions 39A having flexible ends at which the large-diameter portions 39a are formed. The large-diameter portions 39a are larger in diameter than the other portion and are configured to receive connection ends of the tube portion 41E of the orifice member 11G inside, as forementioned. The engagement flanges 31b of the orifice cap nuts 31 engage with the large-diameter portions 39a.

The ends of the tube portions 39A are flexible and deformable and can therefore be readily inserted into the orifice cap nuts 31.

Although the case where the ends of the orifice member both have a male connection structure and the case where the ends of the orifice member both have a female connection structure are shown in the above embodiments, the connection structure is not limited thereto and may be configured such that one end of the orifice member has a male connection structure while the other end has a female connection structure.

The above differential-pressure flow meter 10 may output the flow rate measured by conversion of pressure difference or may directly output the pressures sensed by the first and second pressure sensors 12A and 12B.

The present invention is not limited to the above embodiments; modifications can optionally be added without departing from the spirit of the invention.

The invention claimed is:

1. A differential-pressure flow meter having a pair of pressure-sensing devices fixed to a base member on upstream and downstream sides of an orifice member along a flow channel to determine a flow rate based on a pressure difference measured between the two sides of the orifice member by the pressure-sensing devices, the differential-pressure flow meter comprising:
   specific control boards disposed near pressure-sensing parts installed in the respective pressure-sensing devices, wherein the specific control boards provide control function separately for the pressure-sensing devices, and
   a main control board disposed in a board installation space formed inside the base member, wherein the main control board at least provides some control function common to the pressure-sensing devices,
   the specific control boards being connected to the main control board with wires passing through a plurality of wiring circuits provided in housings of the pressure-sensing devices, external wiring being connected to one of the specific control boards or to the main control board.

2. The differential-pressure flow meter according to claim 1, wherein the board installation space is provided under a bottom surface of the base member in a liquid-tight manner and the pressure-sensing devices are joined to a top surface of the base member so that the wiring conduits are sealed from the outside in a liquid-tight manner.

3. The differential-pressure flow meter according to claim 1, wherein the wiring conduits are divided into a plurality of conduits.

4. The differential-pressure flow meter according to claim 1, wherein:
   the base member is fixed to a first side of the pressure-sensing devices; and
   the specific control boards are disposed on a second side of the pressure-sensing devices, which is different from the first side.

5. The differential-pressure flow meter according to claim 1, wherein:
   each of the specific control boards includes a sensor amplifier for the pressure-sensing part; and
   the main control board includes:
   a power circuit part that is externally supplied with power and that supplies the power to the main control board, the specific control boards and the pressure-sensing parts;
   a pressure-difference sensing part that receives pressures measured by and sent from the pressure-sensing parts to determine the pressure difference across the orifice member;
   a flow-rate converting part that converts the pressure difference determined by the pressure-difference sensing part into the flow rate of the fluid flowing through the flow channel by arithmetic processing; and
   a signal-outputting part that feeds the flow rate fed from the flow-rate converting part.

* * * * *